(12) United States Patent
Shinoda et al.

(10) Patent No.: US 6,388,975 B2
(45) Date of Patent: *May 14, 2002

(54) MECHANISM FOR LOADING DISK INTO DISK DRIVE APPARATUS

(75) Inventors: Takao Shinoda; Yoshiaki Hosokawa; Hideo Nasu, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,739

(22) Filed: Sep. 15, 1998

(30) Foreign Application Priority Data

Oct. 31, 1997 (JP) .............................. 9-301115

(51) Int. Cl.$^7$ .............................. G11B 17/04
(52) U.S. Cl. ..................................... 369/77.2
(58) Field of Search ................. 369/77.2, 75.2, 369/77.1, 247; 360/99.06, 99.12, 85, 90, 93, 137, 97, 132, 96.5

(56) References Cited

U.S. PATENT DOCUMENTS

| | | | |
|---|---|---|---|
| 3,751,043 A | * 8/1973 | Bracci | 274/4 |
| 4,390,913 A | * 6/1983 | Fell et al. | 360/96.5 |
| 4,603,363 A | * 7/1986 | Rickert et al. | 360/97 |
| 4,628,385 A | * 12/1986 | Janssen et al. | 360/99 |
| 4,731,777 A | * 3/1988 | Yoshitoshi et al. | 369/263 |
| 4,791,504 A | * 12/1988 | Igarashi et al. | 360/132 |
| 4,860,136 A | 8/1989 | Sasaki et al. | 360/99.05 |
| 4,866,693 A | 9/1989 | Odawara et al. | 369/75.2 |
| 5,005,093 A | * 4/1991 | Inoue et al. | 360/99.06 |
| 5,132,857 A | * 7/1992 | Russell-Smith et al. | 360/137 |
| 5,548,577 A | * 8/1996 | Miyazaki et al. | 369/291 |
| 5,623,457 A | * 4/1997 | Seto et al. | 369/13 |
| 5,860,611 A | * 1/1999 | Ikebe et al. | 242/343 |
| 5,875,168 A | * 2/1999 | Ogusu et al. | 360/247 |
| 5,898,664 A | * 4/1999 | Kikuchi et al. | 369/291 |
| 5,982,586 A | * 11/1999 | Scura | 360/256 |
| 6,057,992 A | * 5/2000 | Kikuchi | 360/132 |

FOREIGN PATENT DOCUMENTS

| | | |
|---|---|---|
| EP | 579172 | 1/1994 |
| EP | 0 913 821 A2 * | 5/1999 |
| JP | 58-60453 * | 4/1983 |

(List continued on next page.)

*Primary Examiner*—David L. Ometz
*Assistant Examiner*—Tianjie Chen
(74) *Attorney, Agent, or Firm*—Greer, Burns & Crain, Ltd.

(57) ABSTRACT

A loading mechanism by which a disk cartridge can be loaded into a disk drive apparatus includes a mechanism for opening and closing a shutter of the disk cartridge; an elevating plate on which a spindle motor and an alignment pin for positioning the cartridge are mounted; and an oblique surface for moving the elevating plate onto the cartridge side for cartridge insertion. In one case, a front end portion of the first alignment pin is elliptically cylindrical, and only a front end portion of a second alignment pin is curved. The second alignment pin is offset onto the rear side of the apparatus. In another embodiment, a shutter sliding member includes: first and second sliding pieces which slide in a guide groove of a guide frame forming an insertion passage of the cartridge; and a torsion spring. In the first and the second sliding pieces, a shaft portion engages one end of the torsion spring, and a flange interposes the guide groove. In a third embodiment, the elevating plate has two sets of guide pins arranged perpendicularly to the cartridge inserting direction, symmetrically with each other, and on the load plate of the elevator has two oblique surfaces on the right and two oblique surfaces on the left which receive the guide pins and pull up the guide pins when the load plate is moved, and starting positions of these oblique surfaces are shifted in the longitudinal direction.

12 Claims, 18 Drawing Sheets

FOREIGN PATENT DOCUMENTS

| | | |
|---|---|---|
| JP | 2260168 | 10/1990 |
| JP | 03266253 | 11/1991 |
| JP | 04278254 | 10/1992 |
| JP | 04337559 | 11/1992 |
| JP | 06044663 | 2/1994 |
| JP | 06084316 | 3/1994 |
| JP | 06203450 | 7/1994 |
| JP | 06325458 | 11/1994 |
| JP | 07037312 | 2/1995 |
| JP | 7037312 | 2/1995 |
| JP | 7073559 | 3/1995 |
| JP | 07073559 | 3/1995 |
| JP | 07176123 | 7/1995 |
| JP | 07230657 | 8/1995 |
| JP | 8017121 | 1/1996 |
| JP | 696797 | 2/1996 |
| JP | 08017121 | 2/1996 |
| JP | 08096465 | 4/1996 |
| JP | 08329580 | 12/1996 |
| JP | 09082079 | 3/1997 |
| JP | 11-134763 | * 5/1999 |

* cited by examiner

SHUTTER IS CLOSED

SHUTTER IS OPEN

MECHANISM FOR LOADING DISK INTO DISK DRIVE APPARATUS

BACKGROUND OF THE INVENTION

1. Field of the Invention

The present invention relates to a mechanism for loading a disk into a disk loading apparatus. More particularly, the present invention relates to a mechanism for loading an optical disk cartridge into an optical disk cartridge loading apparatus in which a cartridge type removable optical-magnetic disk accommodating an optical-magnetic disk in a cartridge is used. This cartridge type removable optical-magnetic disk will be referred to as an optical disk cartridge in this specification, hereinafter.

2. Description of the Related Art

Recently, the processing capacity and processing rate of personal computers have been increased, and also the size of the operating system and application software and the amount of data to be processed have increased. In the above circumstances, it is required to reduce the size of storage and further it is required to reduce the manufacturing cost. Furthermore, there is a strong demand to increase the capacity and processing rate of storage.

In order to meet the requirements of reducing the size and manufacturing cost and increasing the capacity and processing rate, the optical disk drive apparatus has come into wide use so that it can be used as storage. As an optical disk to be used in this optical disk drive apparatus, there is provided an optical disk cartridge in which an optical disk is accommodated in a cartridge. As the optical disk drive apparatus, in which the optical disk cartridge is used, has come into common use, there are requirements of toughness of the apparatus structure, stability of the apparatus performance, enhancement in the reliability and reduction in the manufacturing cost.

In this connection, the optical disk cartridge is composed in such a manner that an optical disk is accommodated in a case made of plastic. When the optical disk cartridge is used, it is inserted into the optical disk drive apparatus, and a shutter provided in the case is opened, so that a portion of the optical disk can be exposed. Consequently, when the optical disk cartridge is inserted into the optical disk drive apparatus or ejected from the optical disk drive apparatus, the shutter must be opened and closed. Therefore, problems may be caused when the shutter is opened and closed. Accordingly, there is a requirement for solving the above problems.

Concerning the stability of the optical disk cartridge with respect to a base of the cartridge drive apparatus after the optical disk cartridge has been inserted into the optical disk drive apparatus, the stability of the optical disk cartridge may be deteriorated unless an operator handles the optical disk cartridge appropriately. For the above reasons, when the operator loads the optical disk cartridge into the optical disk drive apparatus, it is necessary for him to handle the optical disk cartridge appropriately so that it can be smoothly inserted into the mechanism of the optical disk drive apparatus. Further, it is desired that the manufacturing cost of this mechanism is low.

Referring to a specific example, this will be explained as follows.

In general, the following mechanisms are provided in a conventional optical disk cartridge loading mechanism used for loading an optical disk cartridge into an optical disk drive apparatus.

(1) A mechanism for opening a shutter of the optical disk cartridge when the optical disk cartridge is inserted into the optical disk drive apparatus (2) A position adjusting mechanism for adjusting the alignment of the optical disk cartridge when the optical disk cartridge has been set on the base of the optical disk drive apparatus (3) A mechanism for elevating a spindle motor and connecting it with the optical disk cartridge, which has been set on the base of the optical disk drive apparatus and the shutter of which has been opened, and the mechanism for rotating the optical disk According to the prior art described in the above item (1) in which there is provided a mechanism for opening a shutter of the optical disk cartridge, a member for opening and closing the shutter of the cartridge is formed into a roller-shape having two flanges attached to a rotary shaft. These two flanges are arranged on both sides of a guide groove formed on a plate (cartridge holder) which is also used as a cartridge guide. Therefore, while the opening and closing member is rotating, it can move along the guide groove. Commonly, two flanges of the opening and closing member and the rotary shaft are made of resin, and a shaft portion of the rotary shaft has a spring holding section for holding a spring which generates power when the opening and closing member returns along the guide groove. The spring holding section of the opening and closing member is circular and rotates in the case of movement. Therefore, the burr generated in the process of molding is removed from the flanges by means of machining. Further, the diameter of the shutter opening and closing member is made small so that it can enter a recess for holding the opening and closing member which appears at an end portion of the cartridge when the shutter of the optical disk cartridge is fully opened.

Since the height of the optical disk drive apparatus is limited, only a small clearance is allowed for the height of the guide frame of the optical disk cartridge with respect to the thickness of the cartridge. In the clearance, the flange portion of the shutter opening and closing member is accommodated. The above mechanism for opening and closing the shutter of the optical disk cartridge is disclosed in Japanese Unexamined Patent Publication Nos. 7-37312 and 7-73559.

In the prior art of the position adjusting mechanism, described in the above item (2), for adjusting an alignment in the case of setting the optical disk cartridge onto the base, there are provided alignment pins for positioning the cartridge on both sides of the spindle motor mounting base. On a bottom surface of the optical disk cartridge, there are provided long circular holes for positioning the optical disk cartridge, and these long circular holes are used as reference holes. Accordingly, end portions of the alignment pins are formed into a tapered shape so that they can be easily inserted into two reference holes formed on the bottom surface of the cartridge.

In general, both alignment pins are arranged symmetrically with respect to the inserting direction of the optical disk cartridge. When the optical disk cartridge has been set on the base of the optical disk drive apparatus and a turn table of the spindle motor has been connected with a chucking hub of the optical disk, that is, when chucking of the cartridge has been completed, usually, the alignment pins are inserted into the reference holes of the cartridge while the alignment pins slide on the inside surfaces of the reference holes. After the completion of chucking of the cartridge, it is held as it is while a frictional state is maintained. These alignment pins of the optical disk cartridge are disclosed in Japanese Unexamined Patent Publication No. 8-17121.

According to the moving mechanism of the spindle motor of the prior art described in the above item (3), the slide plate is moved in accordance with the insertion of the optical disk cartridge into the optical disk drive apparatus and, according to the movement of the slide plate, a spindle motor mounting base (spindle motor elevating plate) is elevated by being guided by an oblique groove formed on a load plate moved synchronously with the slide plate. The moving mechanism of the spindle motor is disclosed in Japanese Unexamined Patent Publication No. 8-17121.

However, the following problems may be encountered in the mechanism of the prior art described in the above items (1) to (3).

1. The flange of the opening and closing member is thin and circular. Therefore, when two opening and closing members are arranged in parallel and moved in the guide grooves of the two opening and closing members in accordance with the insertion of the optical disk cartridge, there is a possibility that both opening and closing members interfere with other. In the worst case, they jam and it becomes impossible to return to the initial state.

2. After the flange of the opening and closing member has been formed by means of molding, it is subjected to a machining process to remove a burr from the flange. Therefore, it takes labor in the manufacturing process. A shaft portion of the opening and closing member is composed of two parts so that the spring can be held and the shaft portion can be set in a recess of the optical disk cartridge. Accordingly, the number of parts is large. Further, the diameter of the shaft portion is small because the outer diameter is restricted. Consequently, there is a possibility of lack of the mechanical strength in an abnormal condition.

3. A flange of the opening and closing member on the cartridge side is formed into a thin disk because of the restriction on the space between the cartridge and the cartridge holder and also because of maintaining the mechanical strength at a predetermined value. Therefore, when the cartridge holder is inserted into the holder while a front end of the cartridge is pressed against the cartridge holder, the flange of the opening and closing member first comes into contact with the shutter arm of the cartridge. Accordingly, problems may be caused in the movement of opening the shutter.

4. When the front end portions of the two alignment pins of the spindle motor 2 are formed into a tapered shape, if the cartridge is obliquely inserted, the reference hole does not pass completely over the tapered surface of the alignment pin. Therefore, the cartridge is inserted incompletely.

5. It is common that a detection switch for detecting the cartridge is mounted on the spindle motor mounting base and one of the alignment pins is arranged on the side of the detection switch. In this case, when the cartridge is obliquely inserted and the detection switch is pushed, the alignment pin on the detection switch side can be easily inserted into the reference hole, however, it is difficult for the alignment pin on the opposite side to enter the reference hole. Since the cartridge has already been detected by the detection switch in this case, the spindle motor is rotated although the cartridge is not set in a normal condition.

6. In order to press the spindle motor against the hub of the cartridge that has been inserted into the apparatus, on the loading plate that moves in accordance with the insertion of the cartridge into the optical disk drive apparatus, there is provided an oblique surface for elevating a pin arranged on the elevating plate on which the spindle motor is mounted, and this oblique surface is bent into an L-shape from the loading plate. However, when the elevating plate is lifted upward, an unequal lifting force is caused between the start point and the end point of the oblique surface due to the influence of the mechanical strength on the front end side of the oblique surface and due to the clearance with the pin on the elevating plate side guided by the oblique surface. Due to the above unequal lifting force, the spindle motor cannot be normally lifted.

7. When the cartridge has been completely inserted into the apparatus, it is necessary for an upper surface of the elevating plate to come into contact with the reference base surface of the apparatus. Since a frictional force acts on a surface between the alignment pin and the side of the reference hole of the cartridge, it is necessary to give a force stronger than this frictional force acting on the surface in order to return it to the initial position when the elevating plate is separated from the reference base surface of the apparatus by the influence of vibration or shock. When this necessary force is not given, the elevating plate is maintained in a state in which it is separated from the reference base plate. Therefore, the spindle motor is rotated while being inclined, and the optical disk may be damaged.

SUMMARY OF THE INVENTION

It is an object of the present invention to provide a mechanism for loading an optical disk into a disk drive apparatus in which the problems described in the above items 1 to 7 can be solved.

According to the first aspect of the present invention, a mechanism for loading a disk cartridge into a disk drive apparatus in which a removable disk cartridge is loaded into a disk drive apparatus comprises: an opening and closing means for automatically opening a shutter when the cartridge is inserted into the disk drive apparatus and acts on a shutter opening and closing arm of the cartridge; an elevating plate on which a spindle motor for rotating a disk in the cartridge is mounted and also on which alignment pins inserted into two reference holes formed in the cartridge are mounted; and an elevating means for moving the elevating plate to the cartridge side in accordance with the insertion of the cartridge into the disk drive apparatus, wherein a front end portion of the first alignment pin inserted into a long hole, which is one of the two reference holes provided on the bottom surface side of the cartridge, is tapered, and only a front end portion of the second alignment pin, which is inserted into a circular hole, on the opposite side to the first alignment pin is curved.

In a mechanism for loading a disk cartridge into a disk drive apparatus according to the first aspect, the positions of the surfaces of the first and the second alignment pin on the front surface side of the disk drive apparatus can be shifted from each other by a predetermined distance with respect to a line perpendicular to the inserting direction of the cartridge. In this case, the position of the surface of the second alignment pin on the front surface side can be located on the front side in the inserting direction of the cartridge with respect to a position of the surface of the first alignment pin on front side.

According to the loading mechanism of the first aspect, whatever the posture of the cartridge may be, the first and the second alignment pin can be engaged with the reference holes of the cartridge due to the shapes of the front end portions of the first and the second alignment pin. Due to the shapes of the front end portions of the first and the second alignment pin, it is possible to eliminate an incomplete insertion of the alignment pin into the end surface of the reference hole of the cartridge. As a result, even if the cartridge leans to one side or is inserted obliquely due to the clearance between the cartridge holder and the cartridge, the first and the second alignment pin can be positively engaged with the reference holes of the cartridge.

Since the second alignment pin is offset toward the entrance of the apparatus compared with the first alignment pin, it is possible to avoid the occurrence of a case in which only the second alignment pin on the cartridge sensor side is engaged with the cartridge when the alignment pins are engaged with the reference holes of the cartridge.

According to the second aspect of the present invention, a mechanism for loading a disk cartridge into a disk drive apparatus in which a removable disk cartridge is loaded into a disk drive apparatus comprises: an opening and closing means for automatically opening a shutter when the cartridge is inserted into the disk drive apparatus and acts on a shutter opening and closing arm of the cartridge; an elevating plate on which a spindle motor for rotating a disk in the cartridge is mounted and also on which alignment pins inserted into two reference holes formed in the cartridge are mounted; and an elevating means for moving the elevating plate to the cartridge side in accordance with the insertion of the cartridge into the disk drive apparatus, wherein a member for opening and closing the shutter of the cartridge is composed of first and second opening and closing pieces which slide in a guide groove provided in a guide frame forming a portion of the passage into which the cartridge is inserted, and also composed of torsion springs which urge these pieces to an insertion port side of the cartridge, the first opening and closing piece is provided with a shaft portion, with which one end of the torsion spring is engaged, and also provided with two flanges which interpose the guide groove, the opening and closing second piece is provided with a shaft portion, with which one end of the torsion spring is engaged, and also provided with two flanges which interpose the guide groove, and a portion of the flanges of the second opening and closing piece is provided with a connecting section for connecting these flanges to the outer circumferential portion in the vertical direction.

In a mechanism for loading a disk cartridge into a disk drive apparatus according to the second aspect, the first and the second opening and closing piece are made of resin by means of molding, and hooking slits for hooking the torsion springs to restrict the rotation of the opening and closing pieces with respect to the guide groove are formed on the sides of the shaft portions. In this case, parting lines of metallic dies of the first and the second opening and closing piece made of resin by means of molding are arranged in a direction in which the connecting section is formed, and parting lines remaining in the first and the second opening and closing piece are arranged in a direction in which the guide groove is formed. Further, the flanges of the second opening and closing piece can be formed square. Portions, in which the flanges of the first and the second opening and closing piece are moved, of the guide frame around the guide groove are formed into a recess, which is made hollow onto an opposite side to the cartridge, by means of drawing of sheet metal forming, and the depth of this recess is larger than the thickness of the flanges of the first and the second opening and closing piece. Further, the shaft portion of the first piece for opening and closing is provided with an engaging protrusion for engaging with the arm for opening and closing the shutter of the cartridge, and the shaft portion is accommodated in a groove which appears in a front end portion of the cartridge when the arm for opening and closing the shutter is opened to the maximum.

According to the loading mechanism of the second aspect, the two opening and closing pieces are integrally molded. Therefore, it is possible to reduce the number of parts and enhance the productivity. Further, it is possible to prevent the two opening and closing pieces from coming into contact with and running on each other. Accordingly, the operation of the opening and closing mechanism can be stabilized. When the two opening and closing pieces are molded from resin, the parting line of the metallic mold is set in a direction of the connecting section of the flanges of the opening and closing pieces, that is, the parting line of the metallic mold is set in a direction of the center of the guide groove. Due to the foregoing, the influence of burr on the parting line can be avoided. Further, the engaging protrusion for engaging with the arm for opening and closing the shutter of the cartridge is provided in the shaft portion of the first opening and closing piece. Accordingly, when the shutter is opened, the arm for opening and closing the shutter can be positively engaged with the shaft portion. Therefore, the operation of opening and closing can be stabilized. Further, since the flange of the second opening and closing piece is formed square, it is difficult for the flange portion to separate from a rear end of the guide groove.

According to the loading mechanism of the third aspect of the present invention, a mechanism for loading a disk cartridge into a disk drive apparatus in which a removable disk cartridge is loaded into a disk drive apparatus comprises: an opening and closing means for automatically opening a shutter when the cartridge is inserted into the disk drive apparatus and acts on a shutter opening and closing arm of the cartridge; an elevating plate on which a spindle motor for rotating a disk in the cartridge is mounted and also on which alignment pins inserted into two reference holes formed in the cartridge are mounted; and an elevating means for moving the elevating plate to the cartridge side in accordance with the insertion of the cartridge into the disk drive apparatus, wherein the elevating plate has two sets of guide pins arranged symmetrically with each other in a direction perpendicular to the inserting direction of the cartridge, the slide plate of the elevating means has oblique surfaces, two of the oblique surfaces are arranged on the right and the other two of the oblique surfaces are arranged on the left, the oblique surfaces respectively lift the guide pins when the slide plate is moved, and starting points of the oblique surfaces are shifted in the longitudinal direction with respect to the inserting direction of the cartridge.

In the loading mechanism of the third aspect, the starting points of the two oblique surfaces on the side of the long reference hole formed on the bottom surface of the cartridge are shifted to the inside of the disk drive apparatus with respect to the two oblique surfaces on the side of the circular reference hole. An extending portion is formed on the elevating plate on the front side of the disk drive apparatus, and a magnet for attracting the extending portion is arranged in a casing of the disk drive apparatus at a position opposed to the extending portion under the condition that the cartridge is inserted into the disk drive apparatus.

According to the loading mechanism of the third aspect, the oblique surfaces for lifting the spindle motor, provided on both sides of the elevating plate, are shifted in the longitudinal direction. Therefore, it is possible to conduct correction with respect to play and deflection caused during sliding on the elevating plate. The two oblique surfaces provided on the bottom surface of the cartridge on the long reference hole side are offset to the inside of the optical disk drive apparatus with respect to the two oblique surfaces arranged close to the writing protect tab on the circular hole side. Accordingly, in the case of the sliding of the slide plate, the oblique slide plate can be corrected. Further, the first alignment pin to be positively engaged with the long reference hole is lifted first. As a result, the second alignment pin arranged on the elevating plate close to the cartridge detection sensor is lifted after the first alignment pin has been lifted. Consequently, there is no possibility that only the second alignment pin is engaged. Accordingly, it is possible to prevent the occurrence of such a problem that the cartridge is detected and the motor is rotated in an incomplete chucking condition of the optical disk. In this way, the optical disk can be protected, and further chucking can be stably conducted by the spindle motor.

In addition, when the magnet is arranged below the extending portion of the elevating plate on which the spindle motor is mounted on the base side of the optical disk drive apparatus, the elevating plate, which is a magnetic substance, can be stably set on the base of the optical disk drive apparatus.

In this connection, the loading mechanisms of the first to the third embodiment may be combined with each other in the optical disk drive apparatus.

BRIEF DESCRIPTION OF THE DRAWINGS

The present invention will be clearly understood from the description as set forth below with reference to the accompanying drawings, wherein.

DESCRIPTION OF THE PREFERRED EMBODIMENTS

Referring to the accompanying drawings, embodiments of the present invention will be explained as follows with reference to specific examples.

Figure 1:
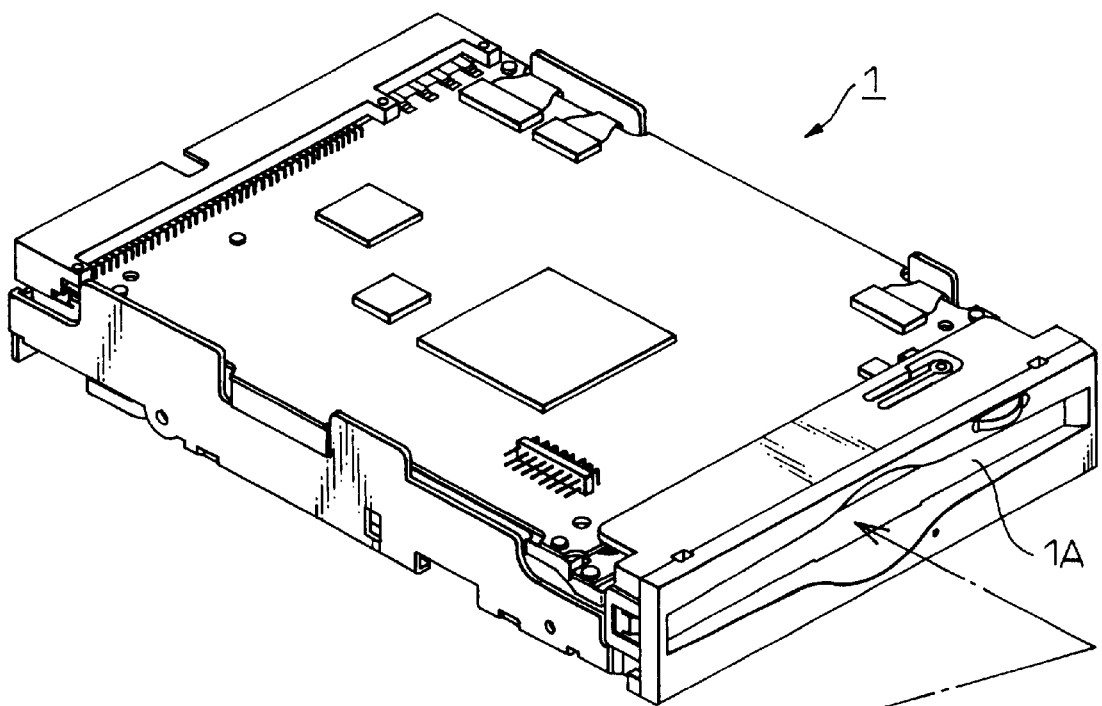
FIG. 1 is a perspective view showing the appearance on the upper surface side of the optical disk drive apparatus of the present invention.
Figure 1:
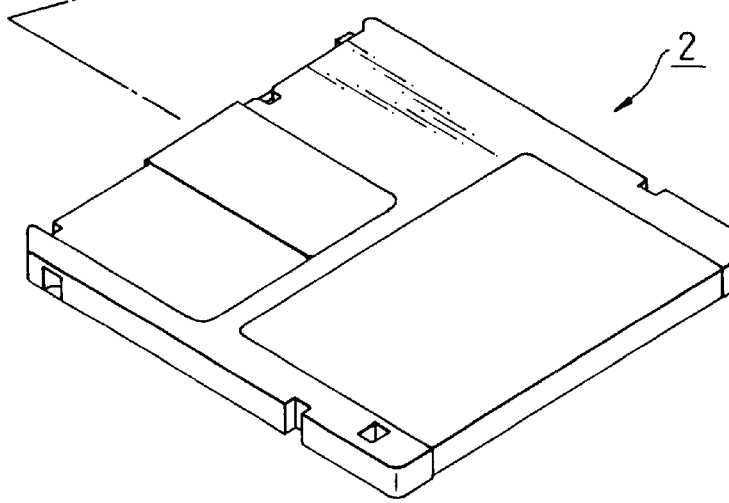
Figure 2:
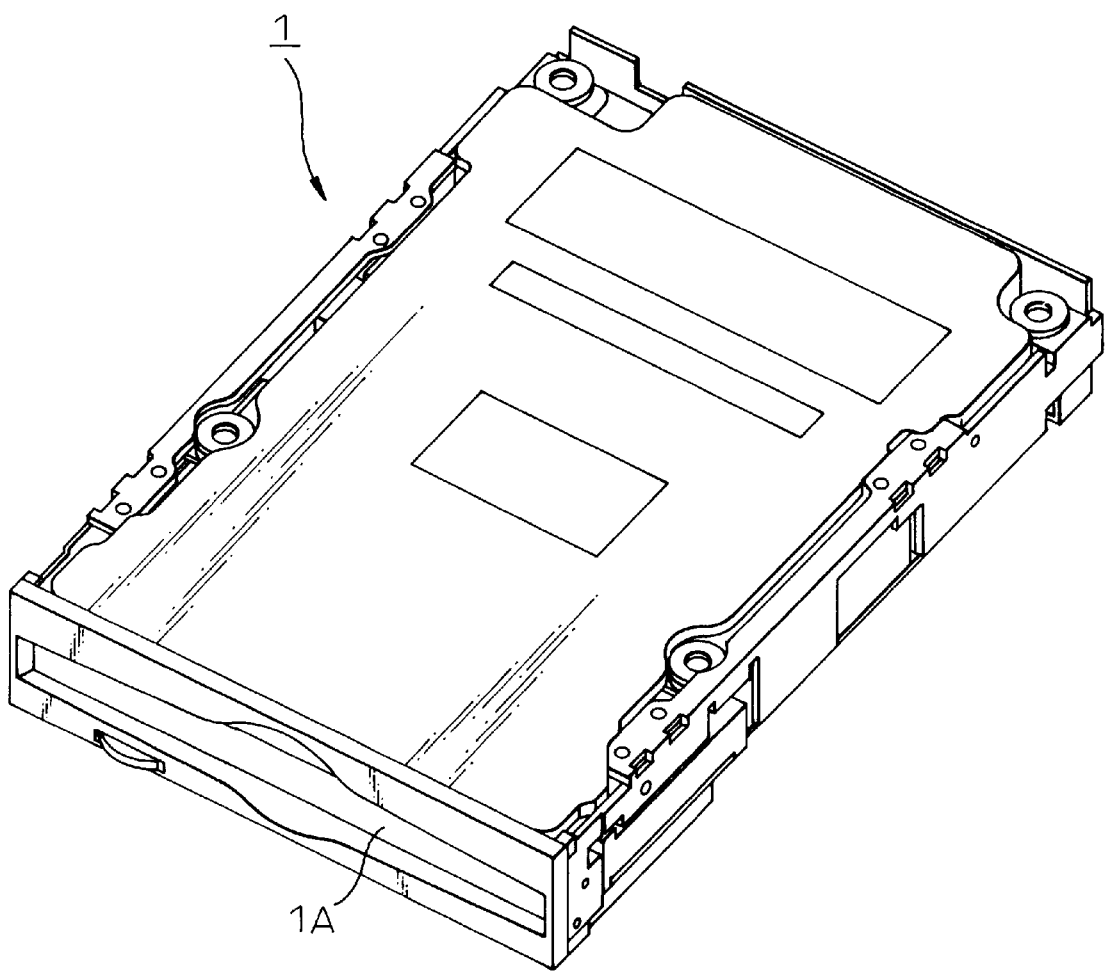
FIG. 2 is a perspective view showing the appearance on the back surface side of the optical disk drive apparatus of the present invention.

FIG. 1 is a view showing the appearance of the upper side of the optical disk drive apparatus 1 to which the present invention is applied, and FIG. 2 is a view showing the appearance of the reverse side of the optical disk drive apparatus 1. An optical disk cartridge 2 in which an optical disk is accommodated in a cartridge is inserted into the optical disk drive apparatus 1. The optical disk drive apparatus 1 conducts reading and writing of data on the optical disk accommodated in the optical disk cartridge 2. The optical disk drive apparatus 1 includes: a loading and ejecting mechanism for loading and ejecting the optical disk cartridge 2, a spindle motor for rotating the optical disk, a bias mechanism, a positioner, a lens actuator, and a stationary optical system. The optical disk cartridge 2 is inserted into the optical disk drive apparatus 1 from an inserting port 1A of the optical disk drive apparatus 1.

Figure 3A:
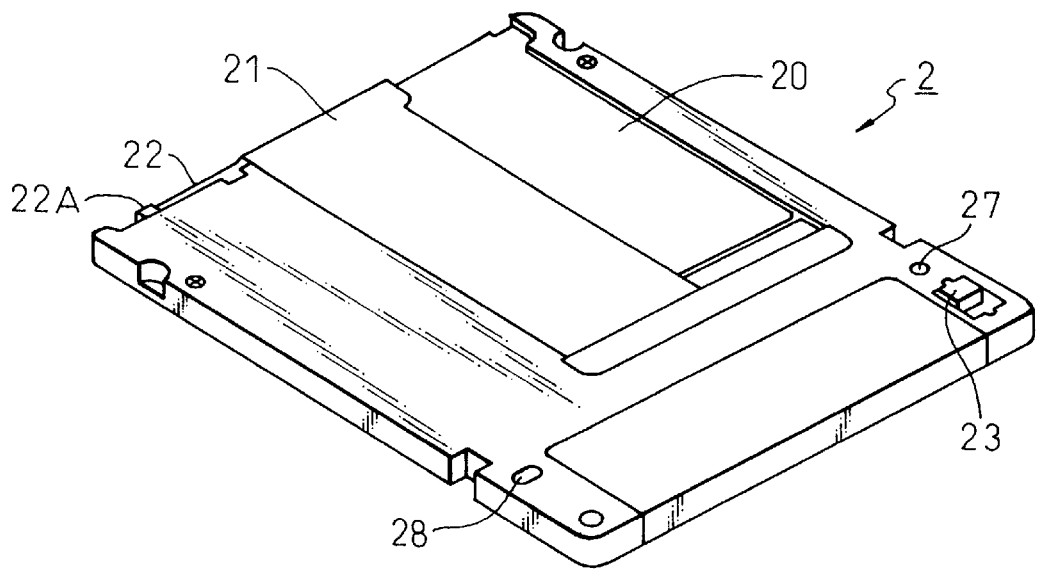
FIG. 3A is a perspective view showing the appearance on the back surface side of the optical disk cartridge used for the optical disk drive apparatus of the present invention, wherein the shutter of the optical disk cartridge is in a closed condition.
Figure 3B:
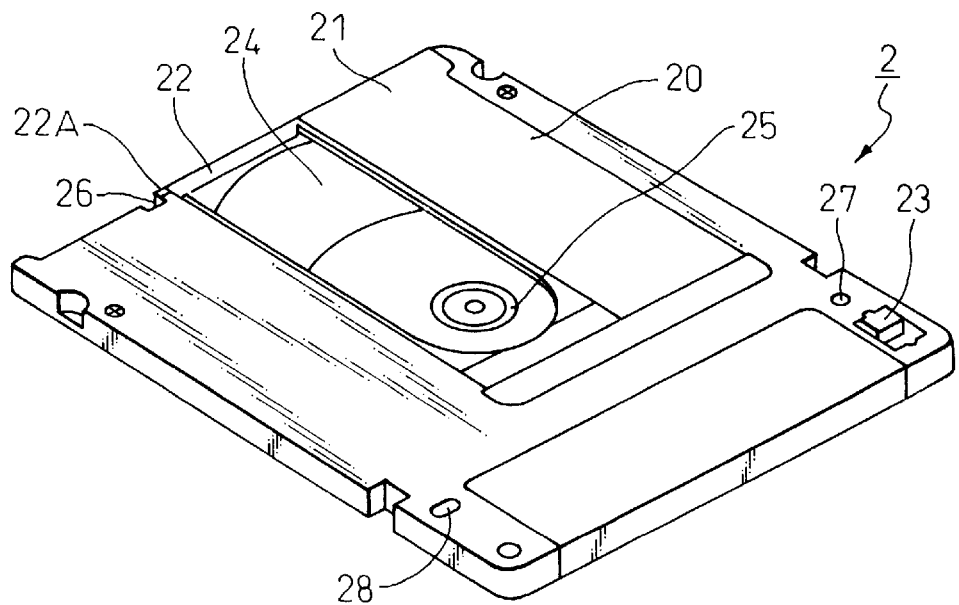
FIG. 3B is a perspective view of the optical disk cartridge shown in FIG. 3A, wherein the shutter of the optical disk cartridge is open.

FIGS. 3A and 3B are views showing the structure of the optical disk cartridge 2 inserted into the optical disk drive apparatus 1. A front side of the optical disk cartridge 2 is shown in FIG. 1, and a rear side of the optical disk cartridge 2 is shown in FIGS. 3A and 3B. As shown in FIG. 3A, there is provided a shutter 21 in a cartridge case 20 of the optical disk cartridge 2. At an end portion of this shutter 21, there is provided a shutter opening and closing arm 22. At one end portion of the cartridge case 20, there is provided a writing protect tab 23 for prohibiting data from being written on the optical disk.

When an end portion 22A of the shutter opening and closing arm 22 is pushed by an opening and closing piece which will be described later, the shutter 21 slides on the cartridge case 20, so that the shutter can be opened. FIG. 3B is a view showing a state of the optical disk cartridge 2, the shutter of which has been fully opened. There is provided an optical disk 24, which is a recording medium, in the cartridge case 20. This optical disk 24 is rotated when a hub 25 arranged at the center of the optical disk 24 is chucked to a spindle motor described later. After the shutter 21 has been fully opened, a holding groove 26, for holding the shutter opening, and closing piece, appears at an end portion of the cartridge case 20. Further, on both sides of the bottom of the cartridge case 20 close to the rear end portion, there are provided two reference holes 27, 28 for positioning the optical disk cartridge 2 in the optical disk drive apparatus 1. One reference hole 27 is a circular hole, and the other reference hole 28 is a long hole. The reference hole, which is a circular reference hole, will be referred to as a circular reference hole 27, and the reference hole, which is a long reference hole, will be referred to as a long reference hole 28, hereinafter, in this specification.

A loading mechanism for loading the optical disk cartridge 2 into the optical disk drive apparatus 1 of the present invention will be explained below. In this case, the loading mechanism includes the following three mechanisms. They are (1) a mechanism for opening and closing the shutter of the optical disk cartridge 2, (2) a mechanism for positioning the optical disk cartridge 2 onto the base of the optical disk drive apparatus, and (3) a mechanism for elevating the spindle motor. Therefore, these three mechanisms are individually explained as follows.

(1) Mechanism for opening and closing the shutter of the optical disk cartridge will be explained below.

Figure 4A:
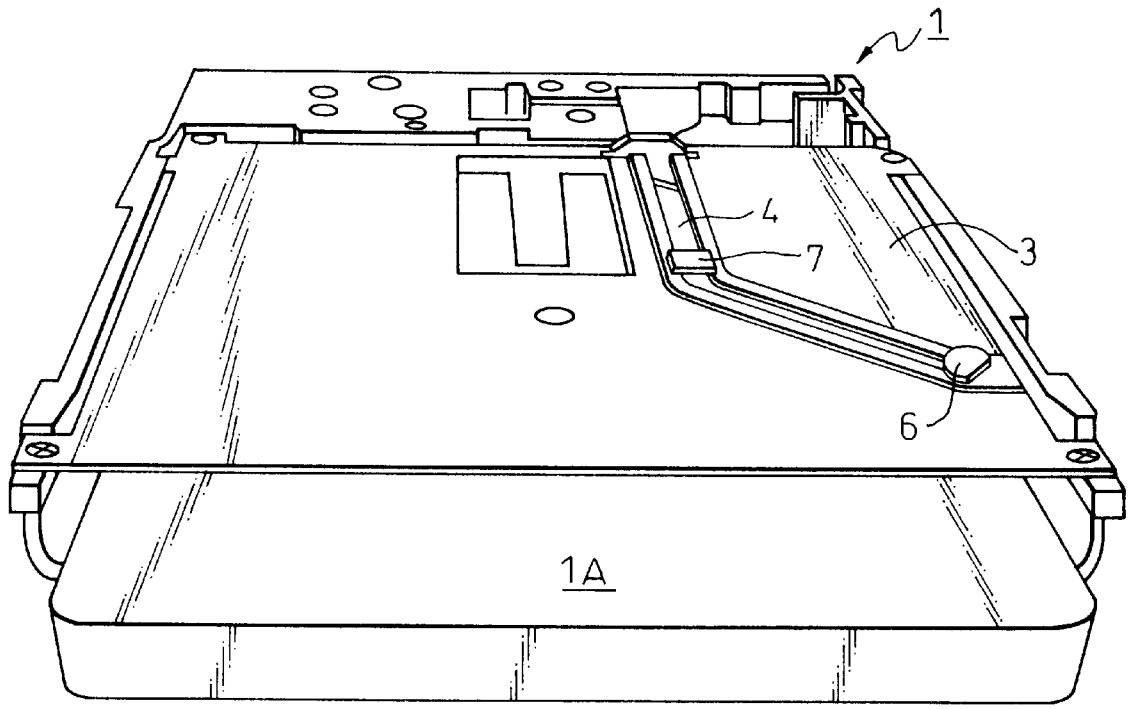
FIG. 4A is a perspective view of the optical disk drive apparatus shown in FIG. 1 from which the cover is removed, wherein the view is taken from the front side.
Figure 4B:
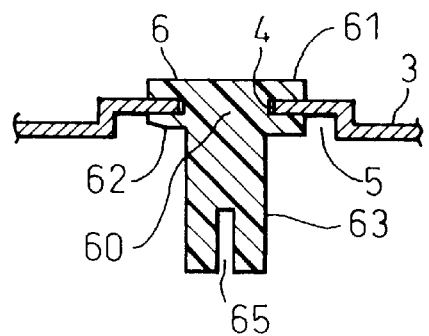
FIG. 4B is a partially enlarged cross-sectional view showing the structure of the first piece used for the optical disk drive apparatus shown in FIG. 4A.

A mechanism for opening and closing the shutter 21 of the optical disk cartridge 2 is shown in FIGS. 4A to 10F. First, FIG. 4A is a view showing a front side of the optical disk drive apparatus 1 from which the cover has been removed. Reference numeral 1A is an inserting port of the optical disk cartridge 2. On the upper side of the inserting port 1A of the optical disk cartridge 2, there is provided a guide frame 3. In this guide frame 3, there is provided a guide groove 4. The guide groove 4 is formed obliquely from the end portion of the inserting port 1A of the cartridge toward the inside, and it is curved in the middle, so that it is arranged in parallel with the longitudinal direction of the optical disk cartridge 1. As shown in FIG. 4B, the periphery of the guide groove 4 formed in the guide frame 3 is made hollow toward the upside by means of sheet metal forming. Therefore, a recess portion 5 is formed on the insertion side of the optical disk cartridge. The first and the second opening and closing pieces 6 and 7 are slidably inserted into the guide groove 4.

Figure 5:
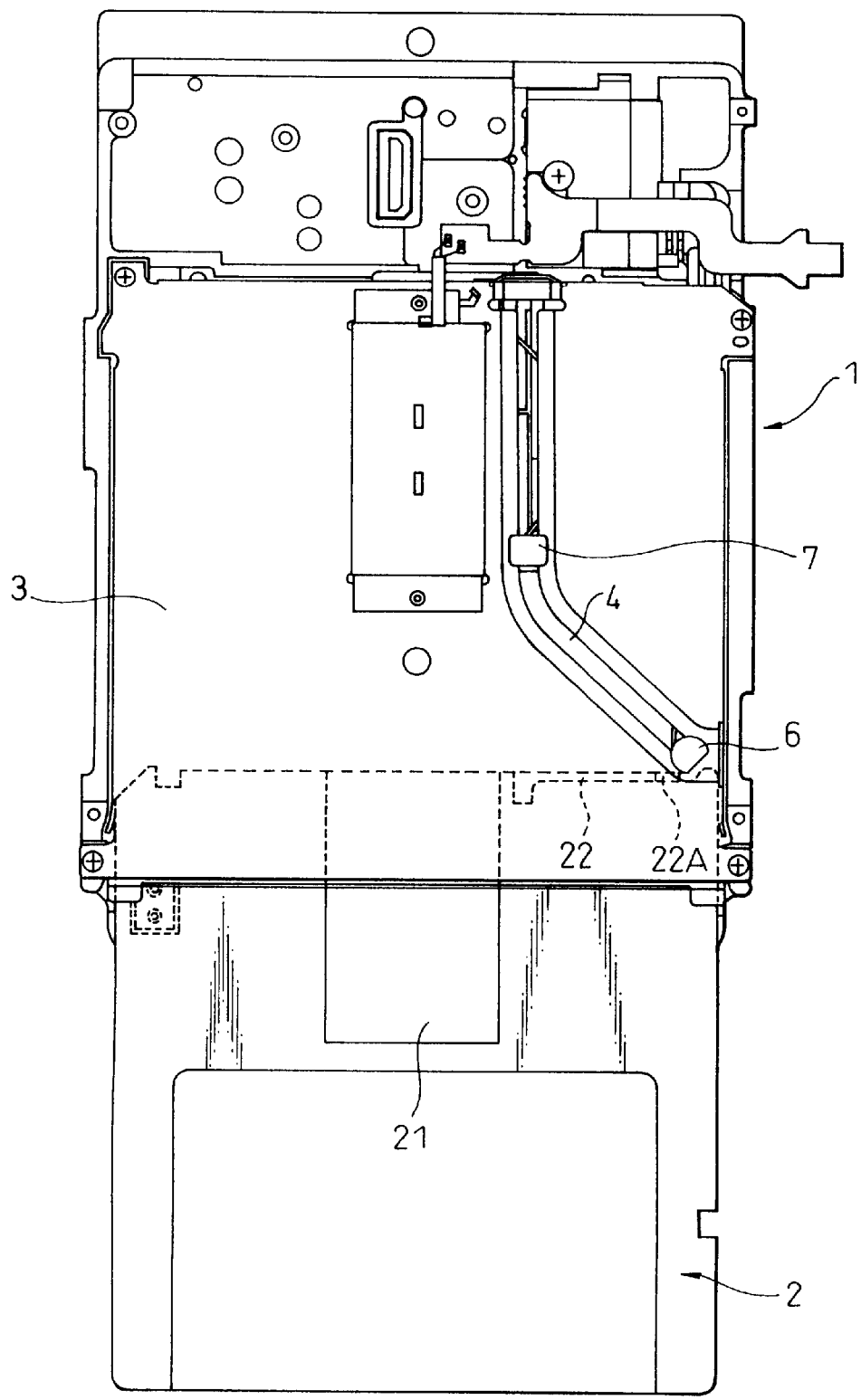
FIG. 5 is a plan view showing a state in which an optical disk cartridge starts being inserted into the optical disk drive apparatus shown in FIG. 4A.

FIG. 5 is a view showing a state immediately after the optical disk cartridge 2 has been inserted into the optical disk drive apparatus 1 from the cartridge inserting port 1A in FIG. 4. When the optical disk cartridge 2 is inserted into the optical disk drive apparatus 1 from the cartridge inserting port 1A, the first opening and closing piece 6 comes into contact with an end portion 22A of the shutter opening and closing arm 22 attached to the shutter 21 of the optical disk cartridge 2.

Figure 6:
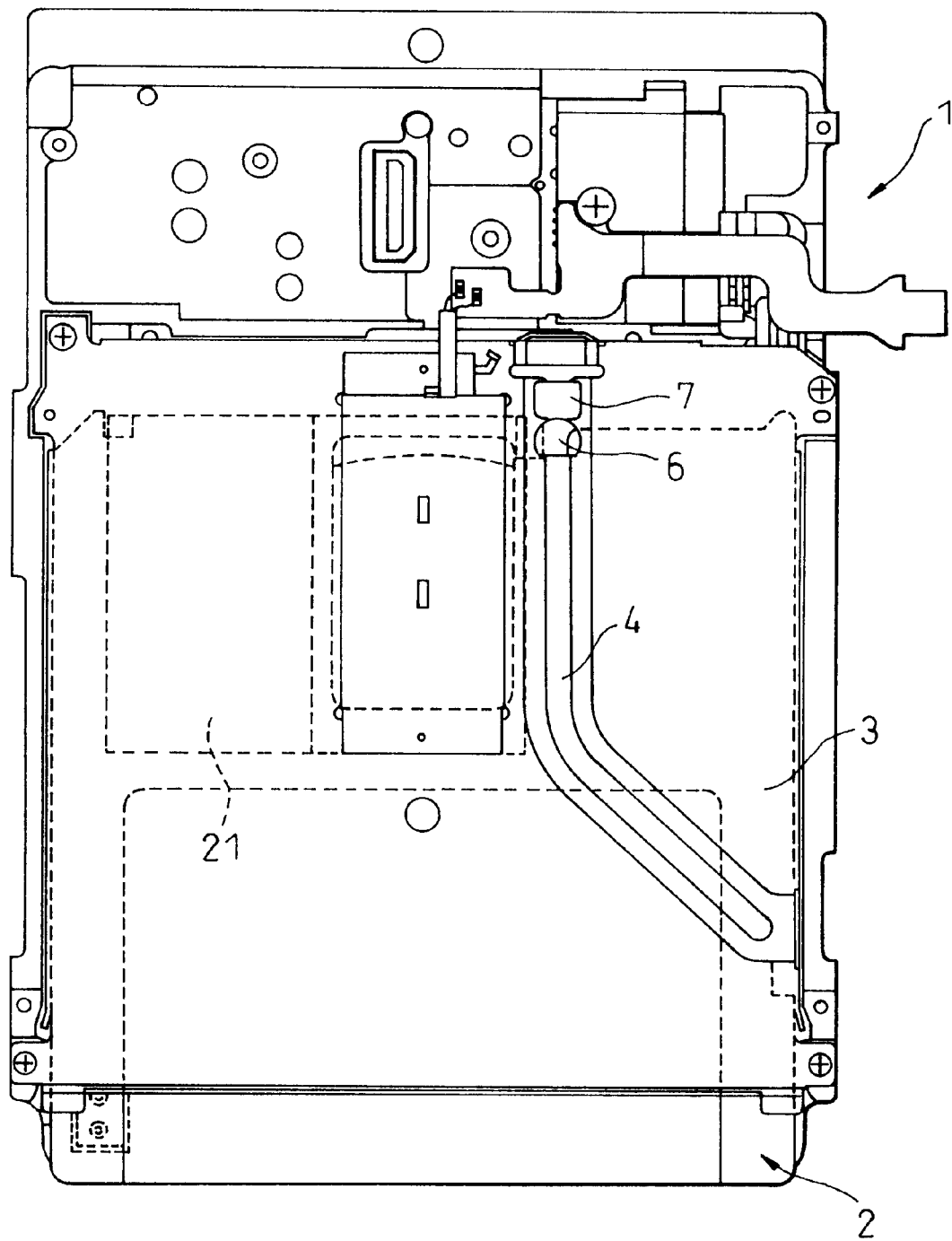
FIG. 6 is a plan view showing a state in which an optical disk cartridge is completely inserted into the optical disk drive apparatus shown in FIG. 4A and a shutter is fully opened.

When the optical disk cartridge 2 is pushed in the above state and inserted into the optical disk drive apparatus 1, the first opening and closing piece 6 is moved inside in accordance with the insertion of the optical disk cartridge 2. Therefore, the shutter opening and closing arm 22 is pushed by the movement of the first opening and closing piece 6, so that the shutter 21 is gradually opened. The second opening and closing piece 7 is connected with the first opening and closing piece 6 by a spring described later. Consequently, in accordance with the movement of the first opening and closing piece 6, the second opening and closing piece 7 is moved to the inside of the apparatus. FIG. 6 is a view showing a state in which the optical disk cartridge 2 has been completely inserted into the optical disk drive apparatus 1 from the state shown in FIG. 5, and the shutter 21 has been fully opened. As described above, when the optical disk cartridge 2 is inserted into the optical disk drive apparatus 1, the shutter 21 of the optical disk cartridge 2 is automatically opened by the first opening and closing piece 6.

Figure 7:
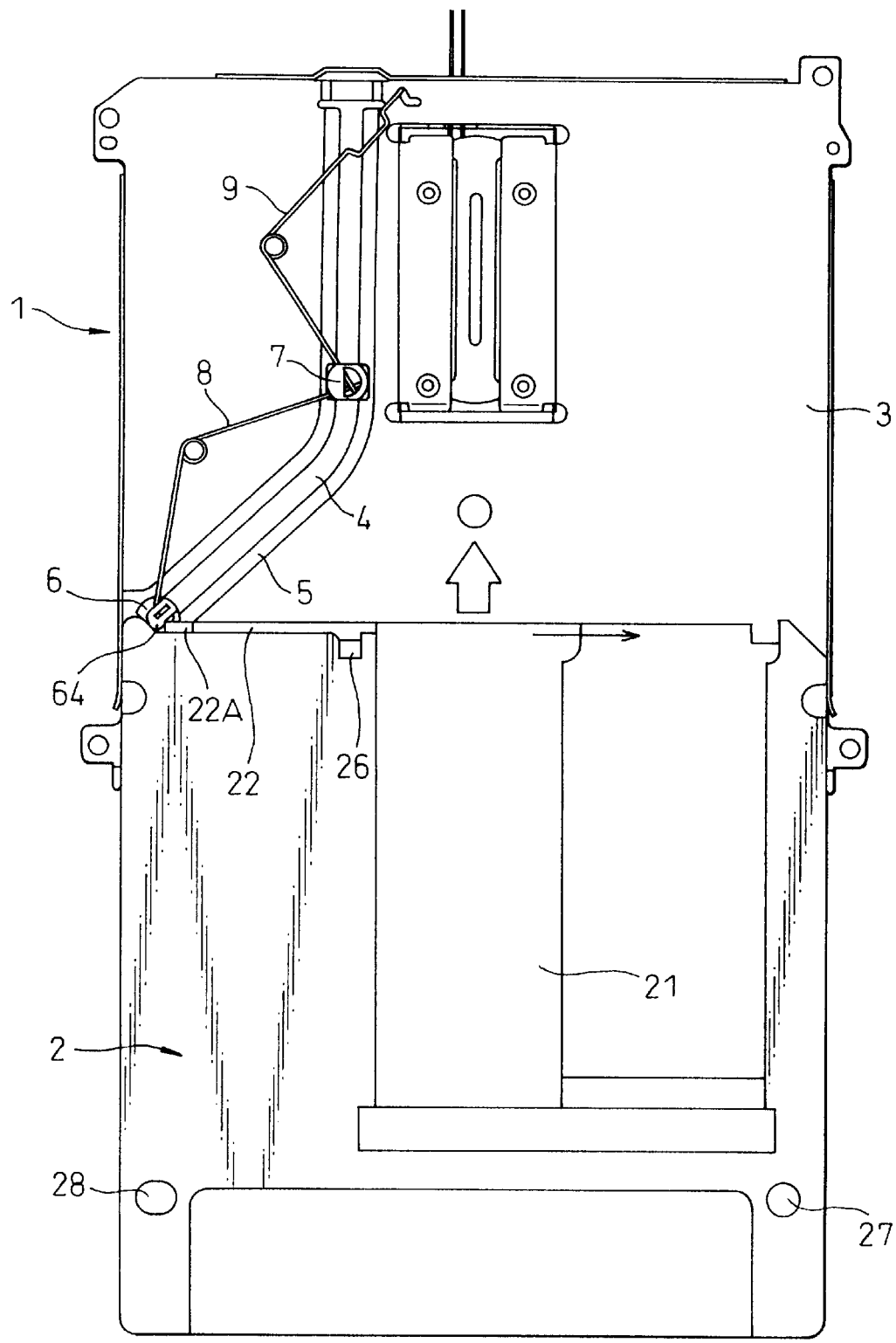
FIG. 7 is a schematic illustration showing a primary portion of the optical disk drive apparatus shown in FIG. 5, wherein the view is taken from the reverse side of an optical disk cartridge.

FIG. 7 is a view showing the shutter opening and closing mechanism operated in the manner described above, wherein the view is taken from the reverse side of the optical disk cartridge 2. The shutter opening and closing mechanism includes: a guide groove 4 provided in the guide frame 3, a recess portion 5 formed in the periphery of this guide groove 4, a first opening and closing piece 6 and a second opening and closing piece 7 which slide in the guide groove 4 and the recess portion 5, a first torsion spring 8 provided between the first and the second opening and closing pieces 6 and 7, and a second torsion spring 9 provided between the second opening and closing piece 7 and an end portion of the guide frame 3. There is provided an engaging protrusion 64 in the first opening and closing piece 6. Therefore, when the optical disk cartridge 2 is inserted into the apparatus, the engaging protrusion 64 can be easily hooked at an end portion 22A of the shutter opening and closing arm 22 of the optical disk cartridge 2.

Figure 8:
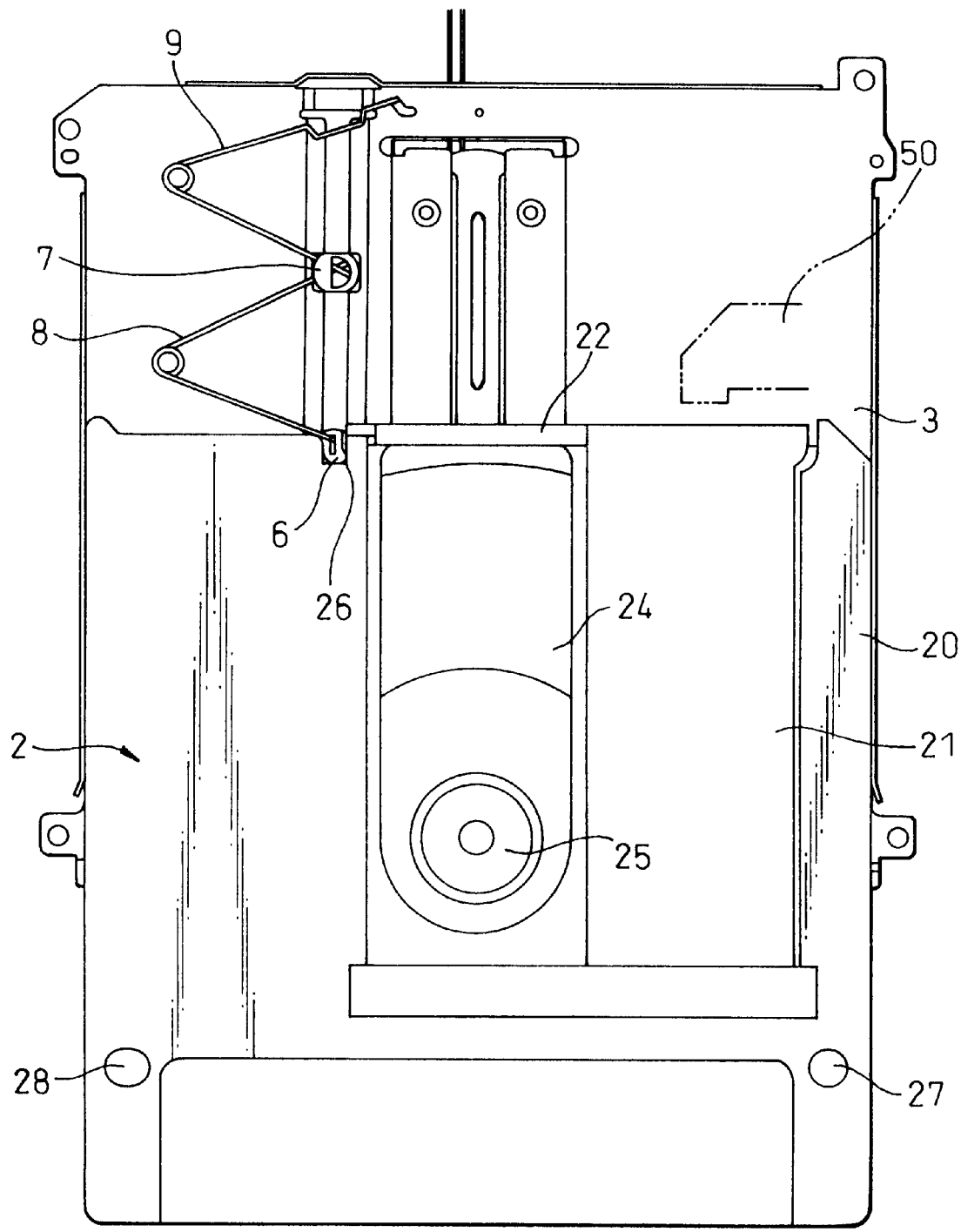
FIG. 8 is a schematic illustration showing a state in which the optical disk cartridge is inserted into the optical disk drive apparatus from the state shown in FIG. 7 and the shutter is fully opened.

FIG. 8 is a view showing a state in which the optical disk cartridge 1 is further inserted into the optical disk drive apparatus 1 from the state shown in FIG. 7 and the shutter 21 is fully opened. When the shutter 21 is fully opened, a holding groove 26 appears which is provided in the front end portion of the optical disk cartridge 2, and the first opening and closing piece 6 enters this holding groove 26. As can be seen in FIG. 8, the shutter 21 of the optical disk cartridge 2 is fully opened in the middle of insertion of the optical disk cartridge 2 into the optical disk drive apparatus 1. The optical disk cartridge 2 is further inserted onto the inside of the optical disk drive apparatus from this state. The reason why the shutter 21 of the optical disk cartridge 2 is fully opened in the middle of insertion of the optical disk cartridge 2 is that a turn table of the spindle motor is caught by the hub 25 of the optical disk cartridge 2.

In this connection, the optical disk drive apparatus 1 is made compact, so that the space in the optical disk drive apparatus 1 is limited. Therefore, in the state explained in FIG. 6 in which insertion of the optical disk cartridge 2 has been completed, the first and the second opening and closing pieces 6 and 7 are contacted with each other and accommodated in the rear end portion of the guide groove 4. According to the conventional structure, flange portions of the first and the second opening and closing pieces 6 and 7 run onto each other at this time, and the opening and closing pieces can not slide smoothly in the guide groove 4. In order to solve the above problems, shapes of the first and the second opening and closing pieces 6 and 7 are formed as shown in FIGS. 9A to 10F in the example of the present invention.

Figure 9A:
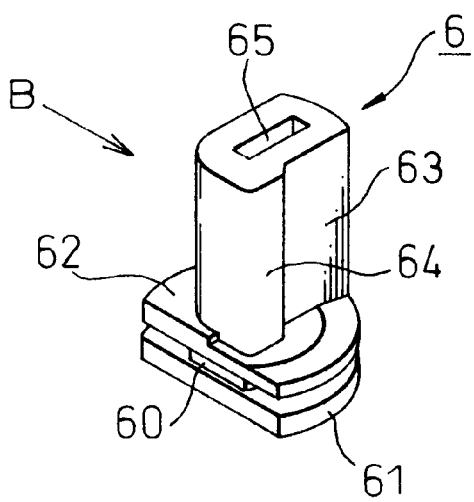
FIG. 9A is a perspective view showing the appearance of the first piece composing a portion of the shutter opening and closing mechanism of the optical disk cartridge in the optical disk drive apparatus.
Figure 9B:
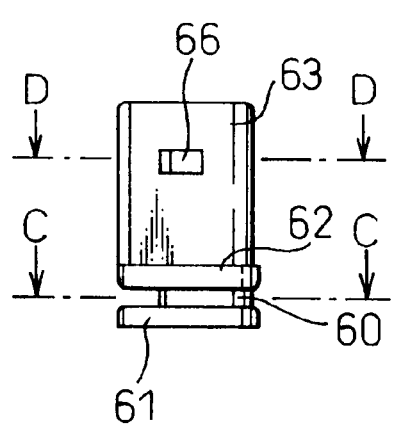
FIG. 9B is a side view of the first piece shown in FIG. 9A, wherein the view is taken in the direction of arrow B.
Figure 9C:
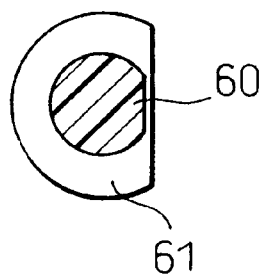
FIG. 9C is a cross-sectional view taken on line C—C in FIG. 9B.
Figure 9D:
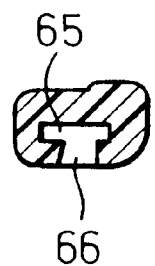
FIG. 9D is a locally cross-sectional view taken on line D—D in FIG. 9B.

FIG. 9A is a perspective view showing an appearance of the first opening and closing piece. FIG. 9B is a side view of the first opening and closing piece shown in FIG. 9A, wherein the view is taken in the direction of arrow B. FIG. 9C is a cross-sectional view taken on line C—C in FIG. 9B. FIG. 9D is a locally cross-sectional view taken on line D—D in FIG. 9B. The first opening and closing piece 6 includes: a guide groove inserting portion 60 to be inserted into the guide groove 4, two flanges 61, 62 holding this guide groove inserting portion 60 between them, and a shaft portion 63 protruding onto the upper surface of the flange 62. The guide groove inserting portion 60 is formed into a substantially columnar shape, and the two flanges 61, 62 are formed into a disk-shape, one portion of which is cut out. The shaft portion 63 is formed into a rectangular parallelepiped, and an engaging protrusion 64 is formed in one portion of the shaft portion 63 so that the end portion 22A of the shutter opening and closing arm 22 can be easily engaged with the engaging protrusion 64. This rectangular parallelepiped portion of the shaft portion 63 is accommodated in the holding groove 26 which appears in the front end portion of the optical disk cartridge 2 when the shutter opening and closing arm 22 is opened at the maximum.

Further, in the shaft portion 63, there is provided a slit 65 in the axial direction. In a direction perpendicular to the slit 63, there is provided a spring insertion hole 66 with which one end of the first torsion spring 8 can be engaged. One end of the first torsion spring 8 enters the inside of the shaft portion 63 from this spring insertion hole 66 and is accommodated in the slit 65.

In this connection, the guide groove inserting portion 60 of the first opening and closing piece 6 of this example is columnar, so that the first opening and closing piece 6 can be easily rotated in the guide groove 4. Therefore, the spring inserting hole 66 of this example is formed on one side of the shaft portion 63 with respect to the direction in which the first opening and closing piece 6 proceeds in the guide groove 4. When one end of the first torsion spring 8 is inserted into this spring inserting hole 66, it is possible to restrict a range of the rotational angle of the first opening and closing piece 6.

Figure 10A:
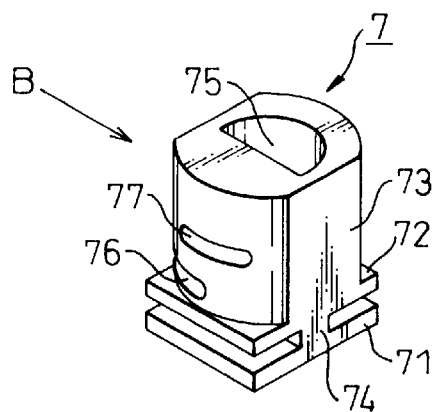
FIG. 10A is a perspective view showing the appearance of the second piece composing a portion of the shutter opening and closing mechanism of the optical disk cartridge in the optical disk drive apparatus.
Figure 10B:
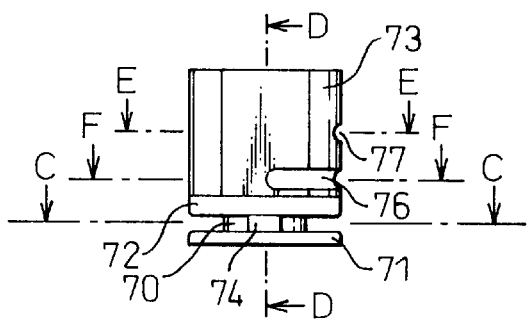
FIG. 10B is a side view of the second piece shown in FIG. 10A, wherein the view is taken in the direction of arrow B.
Figure 10C:
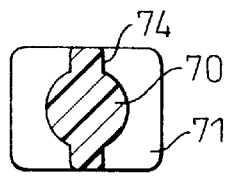
FIG. 10C is a cross-sectional view taken on line C—C in FIG. 10B.
Figure 10D:
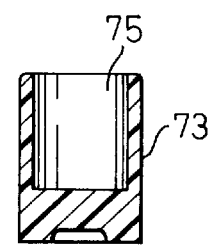
FIG. 10D is a cross-sectional view taken on line D—D in FIG. 10B.
Figure 10E:
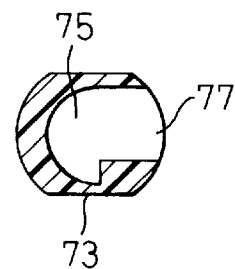
FIG. 10E is a locally cross-sectional view taken on line E—E in FIG. 10B.
Figure 10F:
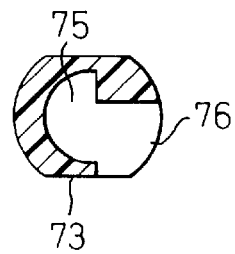
FIG. 10F is a locally cross-sectional view taken on line F—F in FIG. 10B.

FIG. 10A is a perspective view showing an appearance of the second opening and closing piece 7. FIG. 10B is a side view of the second opening and closing piece 7 shown in FIG. 10A, wherein the view is taken in the direction of arrow B. FIG. 10C is a cross-sectional view taken on line C—C in FIG. 10B. FIG. 10D is a cross-sectional view taken on line D—D in FIG. 10B. FIG. 10E is a locally cross-sectional view taken on line E—E in FIG. 10B. FIG. 10F is a locally cross-sectional view taken on line F—F in FIG. 10B. The second opening and closing piece 7 includes: a guide groove inserting portion 70 to be inserted into the guide groove 4, two flanges 71, 72 interposing this guide groove inserting portion 70, and a shaft portion 73 protruding onto the upper surface of the flange 72. The guide groove inserting portion 70 is formed into a substantially columnar shape, and the two flanges 71, 72 are formed into a square shape. The shaft portion 73 is formed into a columnar shape, the portions of which are cut out in parallel with each other.

When the flanges 71, 72 of the second opening and closing piece 7 are formed square as described above, even if the second opening and closing piece 7 moves and reaches the rear end portion of the guide groove 4, the flanges 71, 72 are difficult to separate from the guide groove 4.

Further, there is provided a longitudinal hole 75 in the axial direction in the shaft portion 73. In this shaft portion 73, in a direction perpendicular to this longitudinal hole 75, there are provided a first spring insertion hole 76 and a second spring insertion hole 77, and the first spring insertion hole 76 engages with one end of the first torsion spring 8, and the second spring insertion hole 77 engages with one end of the second torsion spring 9. One end of the first torsion spring 8 enters the shaft portion 73 from the first spring insertion hole 76 and is accommodated in the longitudinal hole 75, and also one end of the second torsion spring 9 enters the shaft portion 73 from the second spring insertion hole 77 and is accommodated in the longitudinal hole 75.

In the second opening and closing piece 7 of this example, the guide groove inserting portion 70 is columnar. Therefore, the second opening and closing piece 7 can be easily rotated in the guide groove 4. Accordingly, in this example, one portion of the columnar guide groove inserting portion 70 is extended to end portions of the flanges 71, 72 in a direction of the guide groove, and this extending portion forms a connecting portion 74. Since the width of this connecting portion 74 is smaller than the width of the guide groove 4, it is possible for the second opening and closing piece 7 to oscillate in the guide groove 4 round the axis of the guide groove inserting portion 70 by a predetermined angle.

As described above, the second opening and closing piece 7 is provided with the connecting portion 74 for connecting portions of the flanges 71 and 72 with each other to the outer circumferences in the vertical direction. Therefore, even if the first opening and closing piece 6 comes into contact with the second opening and closing piece 7, there is no possibility that the first and the second opening and closing pieces 6 and 7 run onto each other.

The first and the second opening and closing pieces 6 and 7 composed as described above can be integrally made of resin by means of molding. In this case, parting lines of the metallic molds for molding the first and the second opening and closing pieces 6 and 7 from resin may be arranged in the same direction as that of the guide groove 4. Due to the foregoing, the parting lines remaining in the first and the second opening and closing pieces 6 and 7 in the molding are made to coincide with the direction of the guide groove 4. When the first and the second opening and closing pieces 6 and 7 are engaged with the guide groove 4, they are restricted so that the rotation exceeding an angle of 90° is not allowed with respect to the guide groove. Therefore, when the first and the second opening and closing pieces 6 and 7 slide in the guide groove 4, no parting lines interfere with the movement of the first and the second opening and closing pieces 6 and 7. Accordingly, even if burr is caused at the positions of the parting lines, it is unnecessary to conduct machining to remove the burr.

The thicknesses of the flanges 62, 72 on the sides of the shaft portions 63, 73 of the first and the second opening and closing pieces 6 and 7 are formed in such a manner that the flanges 62, 72 can be accommodated in the recess portions 5 formed in the periphery of the guide groove 4 of the guide frame 3 by means of drawing of sheet metal forming. Accordingly, there is no possibility that the flanges 62, 72 protrude onto the passage of the optical disk cartridge 2, that is, the inserting operation of the optical disk cartridge 2 is not obstructed by the flanges 62, 72 of the first and the second opening and closing pieces 6 and 7.

(2) A mechanism for positioning the optical disk cartridge onto the base of the optical disk drive apparatus will be explained below.

A mechanism for positioning the optical disk cartridge onto the base of the optical disk drive apparatus is shown in FIGS. 11 to 14C.

Figure 11:
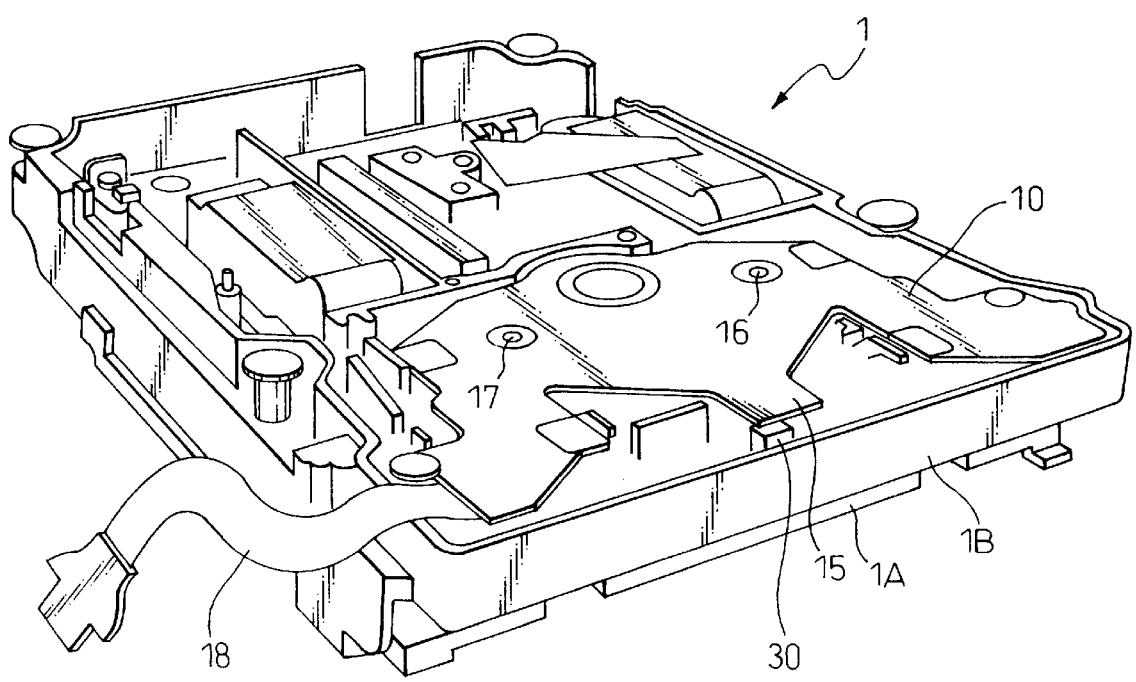
FIG. 11 is a perspective view showing a reverse side of the optical disk drive apparatus of the present invention from which the cover has been removed, wherein the view is taken from the front of the optical disk drive apparatus.

FIG. 11 is a perspective view showing a reverse side of the optical disk drive apparatus 1 from which the cover has been removed, wherein the view is taken from the inserting port 1A side of the optical disk cartridge 2 of the optical disk drive apparatus. On the base 1B on the insertion port 1A side of the optical disk cartridge 2, there is provided an elevating plate 10 on which the spindle motor is mounted. The elevating plate 10 is composed of a magnetic substance such as a plate made of iron. On the base 1B, there are provided two posts into which two guide holes 16, 17 formed on the elevating plate 10 are inserted. At the center of the elevating plate 10, there is provided an extending portion 15 which is extended to the inserting port 1A side of the optical disk cartridge 2. At a position on the base 1B opposed to this extending portion 15, there is provided a magnet 30. When the elevating plate 10 is set on the base 1B, it is attracted by this magnet 30, so that the elevating plate 10 can be stabilized on the base 1B. Reference numeral 18 is a flexible circuit substrate used for transmitting signals to the spindle motor, the detection switch and other components mounted on the elevating plate 10.

Figure 12A:
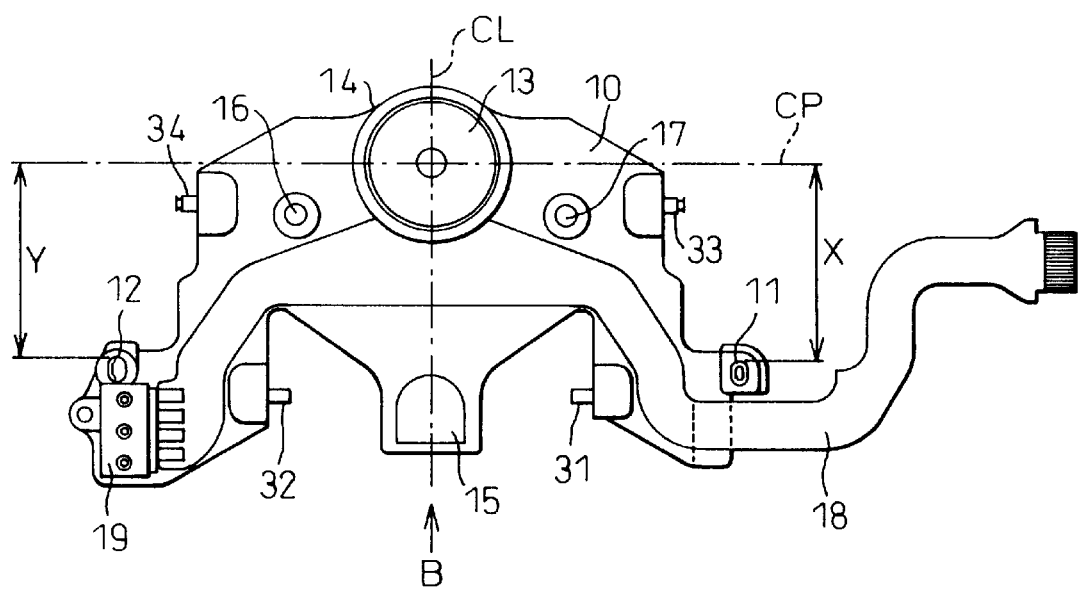
FIG. 12A is a plan view showing the detail of an elevating plate on which a spindle motor is mounted.
Figure 12B:
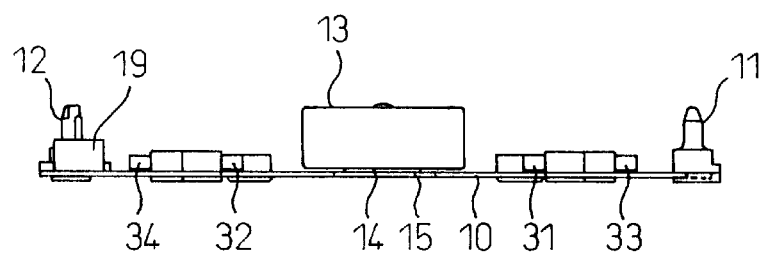
FIG. 12B is a side view showing the elevating plate shown in FIG. 12A, wherein the view is taken in the direction of arrow B.

FIG. 12A is a plan view showing the detail of the elevating plate on which the spindle motor 14 is mounted, and FIG. 12B is a side view showing the elevating plate 10 shown in FIG. 12A, wherein the view is taken in the direction of arrow B. The elevating plate 10 includes: a first alignment pin 11 which protrudes onto the base 1B to the passage side of the optical disk cartridge 2 and is inserted into the reference long hole 28 of the optical disk cartridge 2 when the elevating plate 10 is lifted up and set on the base 1B; a second alignment pin 12 inserted into the circular reference hole 27; a spindle motor 14 having a turn table 13 to be chucked to the hub of the optical disk; guide holes 16, 17 which functions as an elevating guide of the elevating plate 10; a flexible circuit substrate 18; a detection switch 19; and guide pins 31 to 34 for elevating the elevating plate 10. The detection switch 19 detects a position of the writing protect tab 23 of the optical disk cartridge 2 explained in FIGS. 3A and 3B. The guide pins 31, 32 are arranged symmetrically with respect to center line CL which passes through the rotational center of the spindle motor 14 in the same direction as that of the inserting direction of the optical disk cartridge 2. In the same manner, the guide pins 33, 34 is arranged symmetrically with respect to center line CL.

In this connection, in this example, the inequality of X>Y can be established, wherein X is a distance form line CP perpendicular to center line CL to the end surface of the first alignment pin 11, and Y is a distance from line CP perpendicular to center line CL to the end surface of the second alignment pin 12. In this case, line CP passes through the rotational center of the spindle motor. A difference between distance X and distance Y is approximately 0.2 mm. That is, in the case where the diameter of the first alignment pin 11 in the direction of center line CL is the same as the diameter of the second alignment pin 12 in the direction of center line CL, the front surface of the second alignment pin 12 is located at a position on the rear side in the cartridge inserting direction compared with the front surface of the first alignment pin 11. In this connection, the detection switch 19 is arranged close to the second alignment pin 12.

Figure 13A:
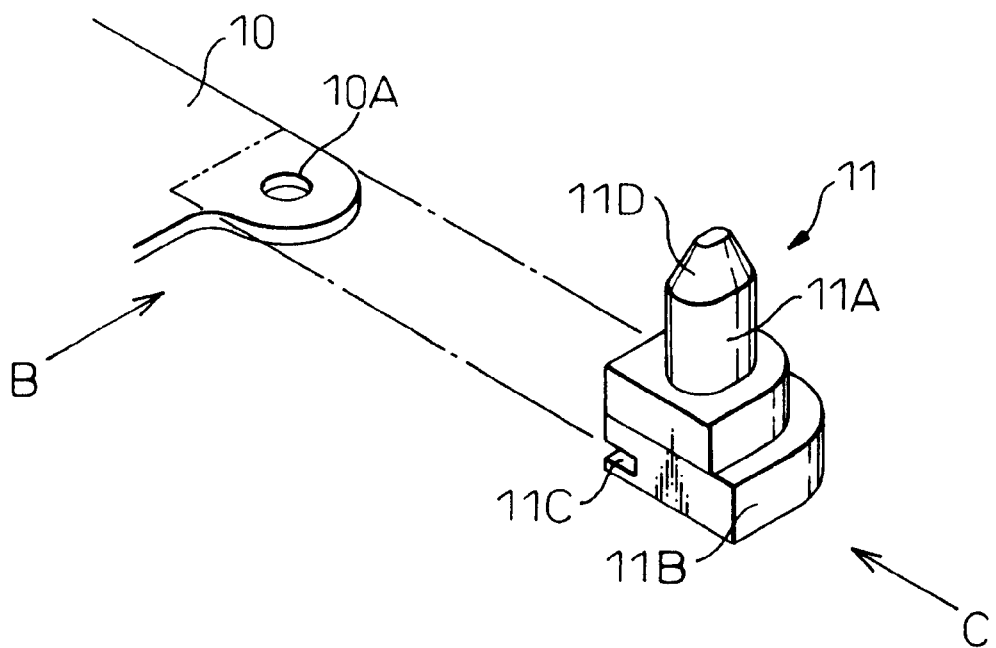
FIG. 13A is a perspective view showing the appearance of the first alignment pin in detail shown in FIGS. 12A and 12B.
Figure 13B:
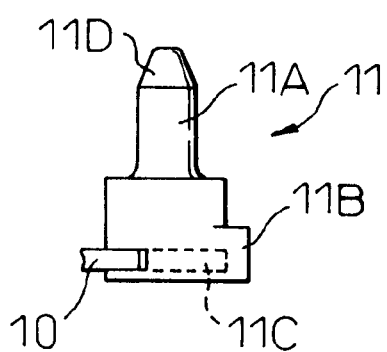
FIG. 13B is a front view showing a state in which the first alignment pin is mounted on the elevating plate, wherein the view is taken in the direction of arrow B in FIG. 13A.
Figure 13C:
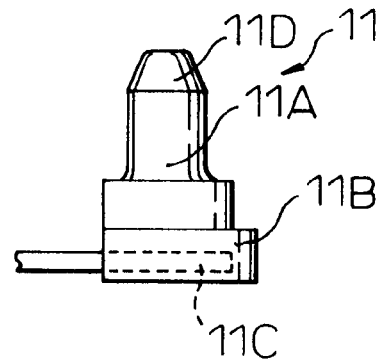
FIG. 13C is a front view showing a state in which the first alignment pin is mounted on the elevating plate, wherein the view is taken in the direction of arrow C in FIG. 13A.

As shown in FIGS. 13A to 13C, the first alignment pin 11 inserted into the long reference hole 28 of the optical disk cartridge 2 includes: a shaft portion 11A, a base 11B from which the shaft portion 11A protrudes, and an attaching slit 1C formed in the base 11B. This first alignment pin 11 is attached to a predetermined position on the elevating plate 10 by means of insertion molding. Reference numeral 10A is a hole used for insertion molding formed on the elevating plate 10. Concerning the shape of the shaft portion 11A of the first alignment pin 11, the section is a flat oval, that is, the shaft portion 11A is elliptically cylindrical, and the front end portion of the shaft portion 11A is formed into a tapered surface 11D.

Figure 14A:
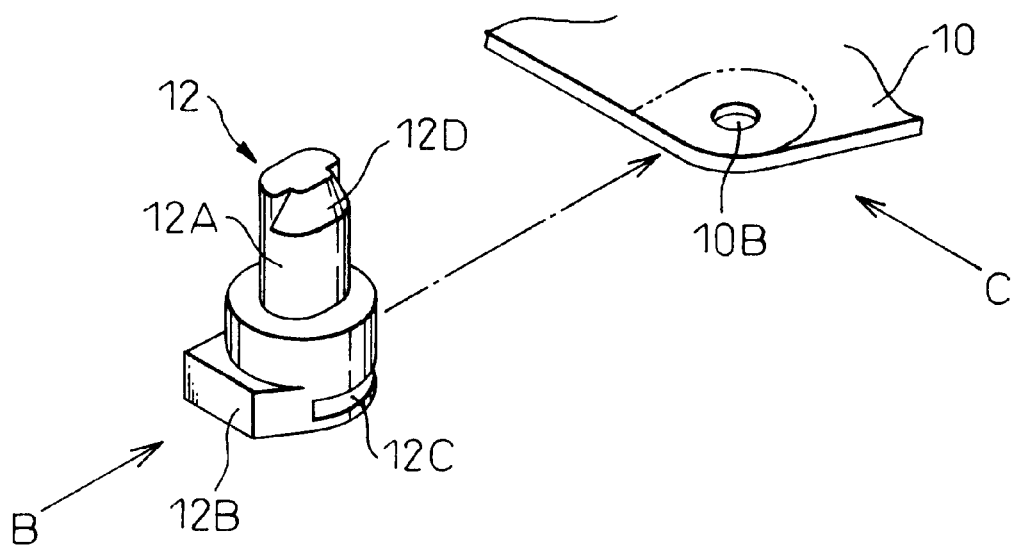
FIG. 14A is a perspective view showing the appearance of the second alignment pin in detail shown in FIGS. 12A and 12B.
Figure 14B:
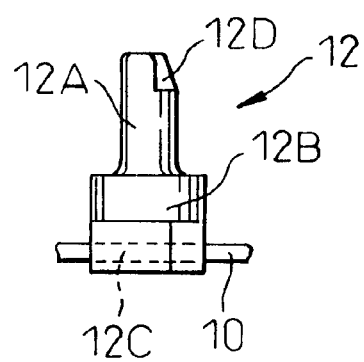
FIG. 14B is a front view showing a state in which the second alignment pin is mounted on the elevating plate, wherein the view is taken in the direction of arrow B in FIG. 14A.
Figure 14C:
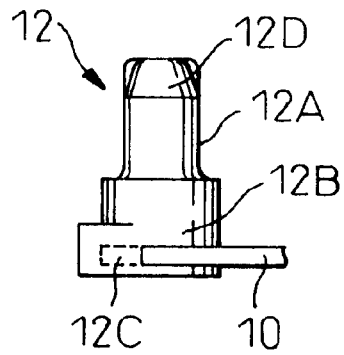
FIG. 14C is a side view showing a state in which the second alignment pin is mounted on the elevating plate, wherein the view is taken in the direction of arrow C in FIG. 14A.

In the same manner, as shown in FIGS. 14A to 14C, the second alignment pin 12, which is inserted into the circular reference hole 27 of the optical disk cartridge 2, includes, a shaft portion 12A, a base 12B from which this shaft portion 12A protrudes, and an attaching slit 12C formed on the base 12B. The second alignment pin 12 is attached to a predetermined position on the elevating plate 10 by means of insertion molding. Reference numeral 10B is a hole for insertion molding formed on the elevating plate 10. A section of the shaft portion 12A of the second alignment pin 12 is a flat oval, that is, the shaft portion 12A of the second alignment pin 12 is formed into elliptically cylindrical shape, and a curved portion 12D is formed in one portion of the front end of the shaft portion 12A. This curved portion 12D is provided in a half portion of the front end of the shaft portion 12A. This curved portion 12D is formed only in the front end portion of the shaft portion 12A on the opposite side to the first alignment pin 11.

The reason why the first alignment pin 11 is arranged on the front side of the apparatus with respect to the second alignment pin 12 will be explained as follows. In general, when the optical disk cartridge 2 is engaged with the spindle motor 14, the position and posture of the optical disk cartridge 2 are determined by the first and the second alignment pins 11 and 12. However, a clearance is necessarily provided in the cross direction of the passage of the optical disk cartridge 2 in the optical disk drive apparatus 1 in the case where no cross-direction adjusting mechanism is provided in order to reduce the manufacturing cost. Further, there is a positional deviation between the reference hole 27 of the optical disk cartridge 2 and the first alignment pin 11, and also there is a positional deviation between the reference hole 28 of the optical disk cartridge 2 and the second alignment pin 12. This positional deviation is caused by a dimensional tolerance that exists originally. Therefore, the apparatus of the present invention is composed as follows. In order that the first and the second alignment pins 11 and 12 hold the reference holes 27, 28 formed on the cartridge side correctly and also in order to allow a slippage of the optical disk cartridge in the cross direction, a tapered surface is formed at the front end portion of the first alignment pin 11, and an oblique surface, the area of which is a half of the front end portion of the shaft portion 1A, is formed at the front end portion of the second alignment pin 12 so that it can follow a slippage of the optical disk in the cross direction, and the residual portion of the front end portion of the shaft portion 1A is formed into a straight shape. The reason why the first and the second alignment pins 11 and 12, which are arranged on the right and left of the spindle motor, are shifted in the longitudinal direction is to prevent only the second alignment pin 12 on the cartridge detection switch 19 side from being engaged earlier than the first alignment pin 11. That is, according to the present invention, the first alignment pin 11 is shifted to the inside of the apparatus so that the alignment pin located on the opposite side to the detection switch 19 can be engaged early.

(3) The mechanism for elevating the spindle motor will be explained below.

Figure 15:
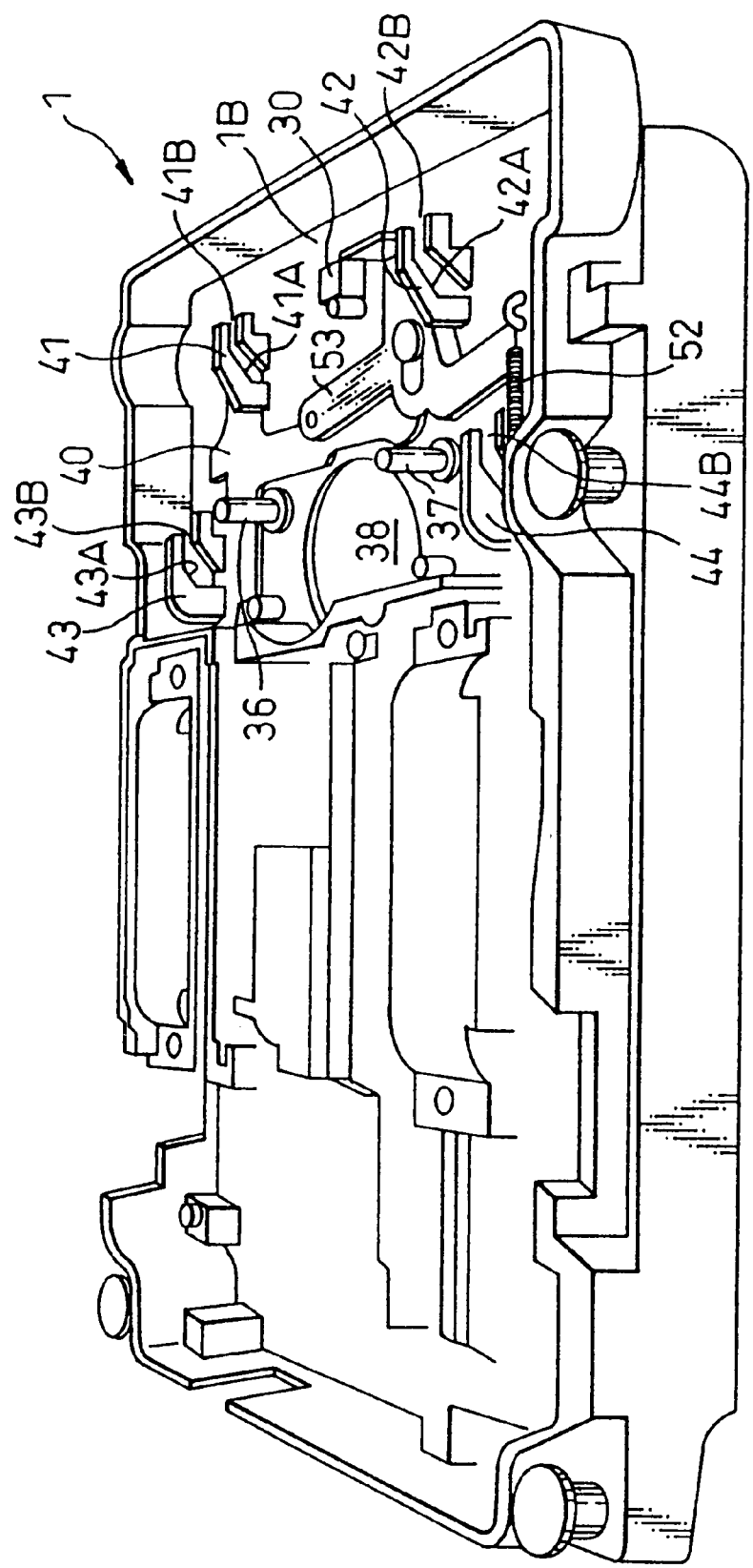
FIG. 15 is a perspective view showing a base, wherein the structure of the base for lifting the elevating plate shown in FIGS. 12A and 12B is shown when the view is taken from the side.

A mechanism for elevating the spindle motor is shown in FIGS. 15 to 18. FIG. 15 is a perspective view showing a base, wherein the structure of the base for lifting the elevating plate 10 explained in FIGS. 12A and 12B is shown when the view is taken from the side. As shown in FIG. 15, posts 36, 37, which are inserted into the guide holes 16, 17 on the elevating plate 10 so that the posts 36, 37 can be used as an elevating guide, protrude from the base 1B of the optical disk drive apparatus 1. Between the posts 36, 37, there is provided a through-hole 38 into which the spindle motor 14 is inserted. On the operator's side (the right in the drawing) with respect to the posts 36, 37 on the base 1B, there is provided a load plate 40 which is engaged with the elevating plate 10 so that the elevating plate 10 can be elevated. On this load plate 40, there are provided four brackets 41 to 44 for elevating the elevating plate 10. This load plate 40 is engaged with the lever 53 and moved in the longitudinal direction of the optical disk drive apparatus 1 when the lever 53 is turned.

Figures 16A, 16B, 16C:
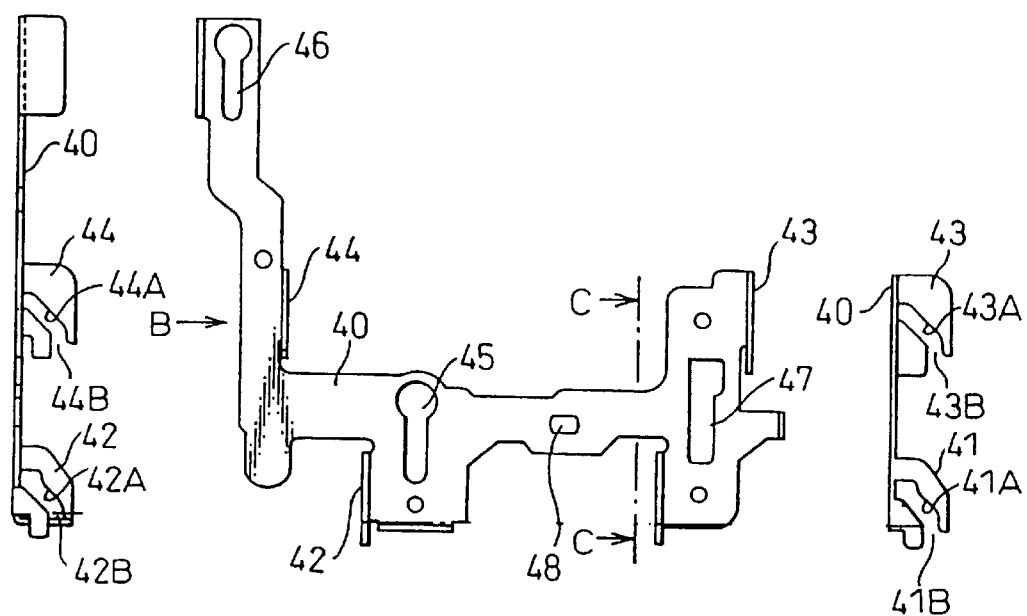
FIG. 16A is a plan view of a load plate provided with a bracket used as a lifting guide of the elevating plate.
FIG. 16B is a side view of the load plate taken on line C—C in FIG. 16A in the direction of arrow B.
FIG. 16C is a cross-sectional view taken on line C—C of the load plate in FIG. 16A.

FIGS. 16A to 16C are views showing the detail of the structure of the load plate 40. FIG. 16A is a bottom view of the load plate 40. FIG. 16B is a side view of the load plate 10 taken on line C—C in FIG. 16A in the direction of arrow B. FIG. 16C is a cross-sectional view taken on line C—C of the load plate in FIG. 16A. The load plate 40 is composed of one plate in this example, and the predetermined four portions of the load plate 40 are bent by a right angle, so that the first 41 to the fourth bracket 44 are formed on the load plate 40. In each bracket 41 to 44, there is provided a guide groove 41B to 44B for receiving a guide pin 31 to 34 arranged on the elevating plate 10. The base 1B side of each guide groove 41B to 44B is formed into an oblique surface 41A to 44A. On the load plate 40, there are provided guide holes 45 to 47 which function as a slide guide. Reference numeral 48 is a connecting hole connected with the lever 53 explained in FIG. 15.

In this example, two oblique surfaces 41A, 43A of the first 41 and the third bracket 43 on the circular reference hole 27 side provided on the bottom of the optical disk cartridge 2 are offset to the inside of the optical disk drive apparatus by a predetermined distance Z with respect to the two oblique surfaces 42A, 44A of the second 42 and the fourth bracket 44 provided on the long reference hole 28. As a result, the second alignment pin 12 provided close to the detection switch 19 is lifted up to the base 1B side a little more slowly than the first alignment pin 11.

Figure 17:
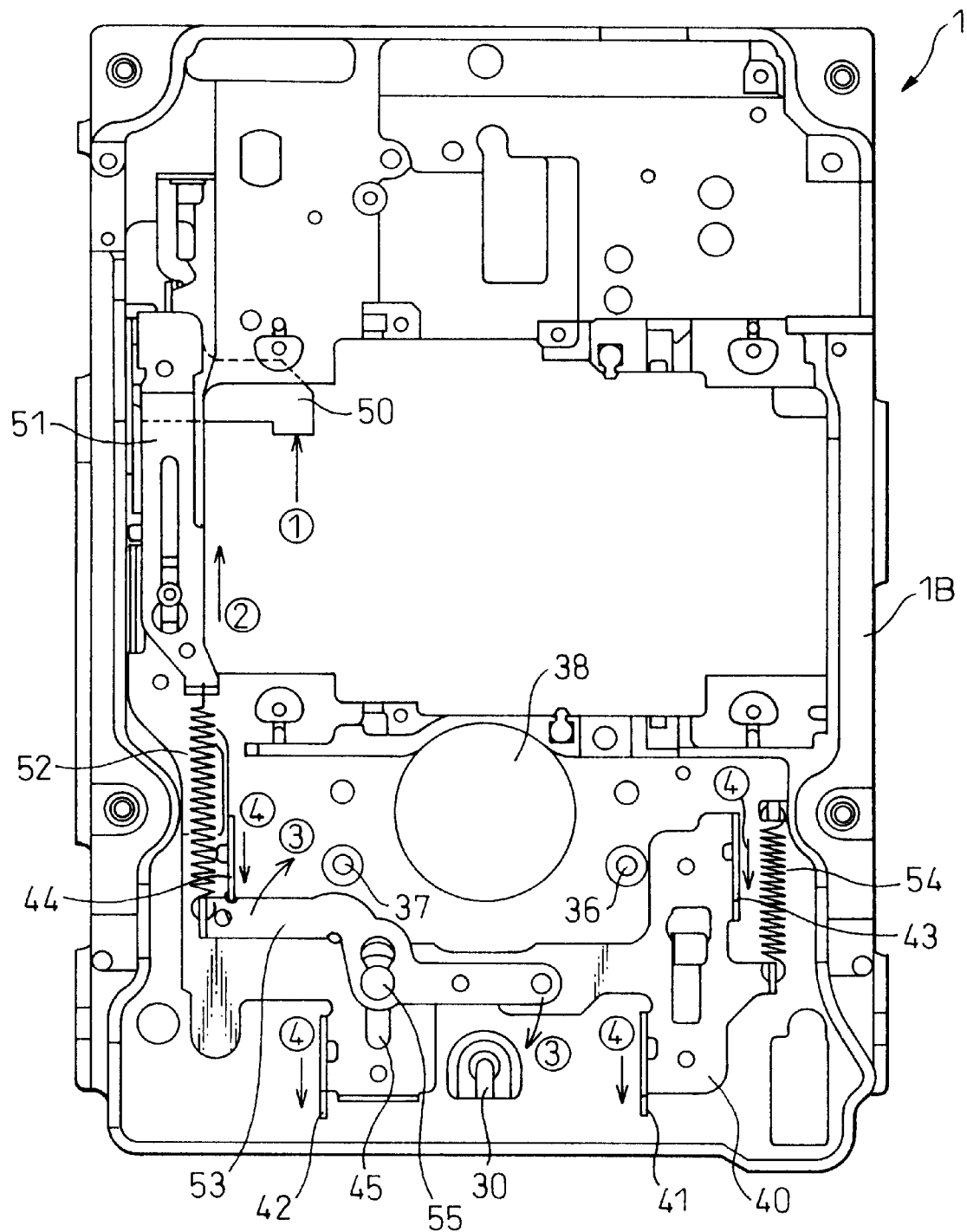
FIG. 17 is a bottom view of the base showing an elevating mechanism of the elevating plate.

FIG. 17 is a bottom view of the base 1B of the optical disk drive apparatus 1 showing an overall arrangement of the elevating mechanism of the elevating plate 10. The elevating mechanism of the elevating plate 10 includes a moving block 50, slide plate 51, chucking spring 52, lever 53, load plate 40 and return spring 54.

The moving block 50 protrudes into a moving passage of the optical disk cartridge 2 in the optical disk drive apparatus as shown in FIG. 8. After the shutter 21 of the optical disk cartridge 2 has been fully opened, the moving block 50 comes into contact with the optical disk cartridge 2 and moves together with it. The slide plate 51 is connected with this moving block 50 and moved together with the moving block 50. The chucking spring 52 connects the slide plate 51 with the lever 53. The lever 53 is pivotally attached to the rotary shaft 55 protruding from the base 1B. One end of the lever 53 is connected with the chucking spring 52, and the other end of the lever 53 is pivotally connected with the load plate 40 via a pin. The load plate 40 is arranged on the base 1B, and the guide hole is inserted into the rotary shaft 55. The return spring 54 is provided between the load plate 40 and the base 1B. The return spring 54 pulls back the load plate 40 which has been moved by the rotation of the lever 53.

Operation of the elevating mechanism of the elevating plate 10 composed as described above will be explained as follows. When the optical disk cartridge 2 is inserted into the optical disk drive apparatus 1 and contacted with the moving block 50, the moving block 50 is moved in the direction shown by arrow (1) in the drawing. When the moving block 50 is moved in the direction shown by arrow (1), the slide plate 51 connected with the moving block 50 is moved in the direction shown by arrow (2). When the slide plate 51 is moved in the direction shown by arrow (2), the lever 53 connected with the slide plate 51 by the chucking spring 52 is rotated round the rotary shaft 55 in the direction of arrow (3). When the lever 53 is rotated round the rotary shaft 55 in the direction of arrow (3), the load plate 40 connected with one end of the lever 53 is moved in the direction of arrow (4). As a result, the four brackets 41 to 43 are also moved in the direction of arrow (4).

On the other hand, when the optical disk cartridge 2 is ejected from the optical disk drive apparatus 1, the load plate 40 is pulled back by the action of the return spring 54. Therefore, the load plate 40 is moved in the direction opposite to arrow (4), and the lever 53 is rotated in the direction opposite to arrow (3). Further, the slid plate 51 is moved in the direction opposite to arrow (2), and the moving block 50 is moved in the direction opposite to arrow (1), so that it returns to the initial position.

Figure 18:
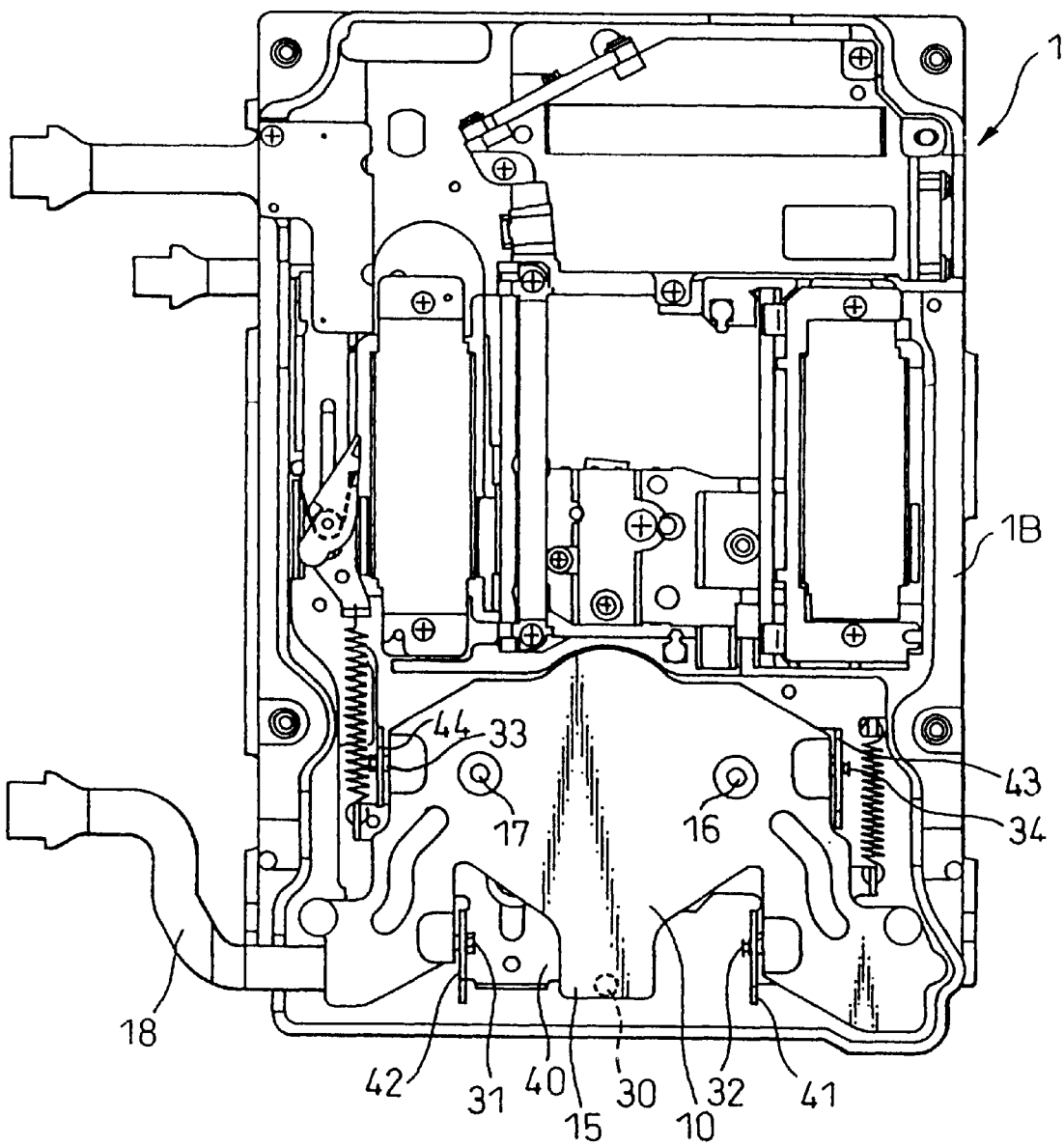
FIG. 18 is a bottom view showing a state in which the elevating plate and the load plate shown in FIG. 17 are connected with each other.

FIG. 18 is a view showing a state of connection in which the elevating mechanism of the above elevating plate 10 is connected with the elevating plate 10. Two guide holes 16, 17 on the elevating plate 10 are inserted into the posts 36, 37 protruding from the base 1B, and the guide pins 31 to 34 arranged on the elevating plate 10 are respectively attached to the first 41 to the fourth bracket 44 arranged on the load plate 40. Guide pins 31 to 34 arranged on the elevating plate 10 are located close to the entrances of the guide grooves 41B to 44B when the optical disk cartridge 2 is not inserted into the optical disk drive apparatus 1. When the optical disk cartridge 2 is inserted into the optical disk drive apparatus 1 and the load plate 40 is moved to the front direction (the direction of arrow (4) in FIG. 17) of the base 1B, the guide pins 31 to 34 are pulled up to the base 1B side along the oblique surfaces 41A to 44A of the brackets 41 to 44, and the elevating plate 10 is set on the base 1B. Therefore, the alignment pins 11, 12 provided on the elevating plate 10 are engaged with the reference holes 27, 28 of the optical disk cartridge 2, and the spindle motor is chucked to the optical disk cartridge 2 at the same time. The elevating plate 10 is held on the reference surface of the base 1B under the condition that the elevating plate 10 is chucked to the optical disk cartridge 2.

Two oblique surfaces 41A, 43A of the first and the third brackets 41 and 43 on the circular reference hole 27 side provided on the bottom of the optical disk cartridge 2 are offset to the inside of the optical disk drive apparatus by a predetermined distance Z with respect to the two oblique surfaces 42A, 44A of the second and the fourth brackets 42 and 44 provided on the long reference hole 28. Accordingly, the second alignment pin 12 arranged close to the detection switch 19 of the elevating plate 10 is lifted up onto the base 1B side a little more slowly than the first alignment pin 11. As a result, even if deflection and play are caused on the load plate 40, the elevating plate 10 can be uniformly lifted up by the effect of offset of the brackets 41, 43 and set on the reference surface of the base 1B, and further the first alignment pin 11 arranged on the opposite side to the detection switch 19 can be positively engaged with the reference hole 28 of the optical disk cartridge 2 before the second alignment pin 12 is engaged with the reference hole. Accordingly, when the optical disk cartridge 2 is in an inappropriate posture, the optical disk cartridge 2 can not be detected by the detection switch 19.

After the optical disk cartridge 2 has been inserted into the apparatus, the optical disk cartridge 2 and the alignment pins 11, 12 come into contact with each other under the condition that a frictional force always acts between them. When vibration is given to the spindle motor 14 at this time, even if the optical disk cartridge 2 is kept in an appropriate posture, there is a possibility that the elevating plate 10 is held being lifted up from the reference surface of the base 1B. According to this example, the magnet 30 is arranged on the base 1B, and the elevating plate 10 is attracted onto the base 1B side by the magnet 30 when the elevating plate 10 is set onto the base 1B. Consequently, according to this example, even if an external force is given to the spindle motor, it is possible to prevent the elevating plate 10 from being lifted up from the reference surface of the base 1B.

The loading mechanism into which the above three mechanisms are entirely incorporated can exhibit the most excellent effect. However, it is possible to provide an excellent effect when only one of the above three mechanisms is incorporated or when any two mechanisms are incorporated.

In this connection, in the above example, explanation is made in a case in which the optical disk drive apparatus and the optical disk cartridge are used. However, it should be noted that the loading mechanism of the present invention can be used as a loading mechanism of a floppy disk drive apparatus in which a floppy disk having the same shutter mechanism as that of the optical disk cartridge is used.

What is claimed is:

1. A disk drive apparatus having a mechanism for loading a cartridge, in which the cartridge, which is removable, is loaded through an insertion port, comprising:
   at least one sliding piece member which automatically opens a shutter when the cartridge is inserted into the disk drive apparatus and acts on a shutter opening and closing arm of the cartridge;
   an elevating plate on which a spindle motor for rotating a disk in the cartridge is mounted and on which first and second alignment pins inserted into two reference holes formed in the cartridge are mounted; and
   an elevator which moves the elevating plate to the cartridge side in accordance with the insertion of the cartridge into the disk drive apparatus,
   wherein the tip portion of a first alignment pin inserted into a long hole, which is one of the two reference holes provided on the cartridge, is an elliptical cylinder, and only a second tip portion of the second alignment pin, which is inserted into a circular hole on the opposite side to the long hole, has a tapered curved surface which is formed in a half portion on an opposite side of the first alignment pin so as to follow a slippage of the cartridge in a direction perpendicular to an insertion direction of the cartridge, and a residual portion of the second tip portion of the second alignment pin is formed into a non-tapered shape.

2. A disk drive apparatus according to claim 1, wherein surfaces of the first and the second alignment pins on the front surface side of the disk drive apparatus are shifted from each other by a predetermined distance in a direction parallel to the inserting direction of the cartridge.

3. A disk drive apparatus according to claim 2, wherein the first alignment pin is closer to the insertion port than the second alignment pin.

4. A disk apparatus according to claim 1, further comprising:
   a cartridge detection sensor provided on the elevating plate,
   wherein said first alignment pin is arranged on the opposite side of the cartridge detection sensor, and said second alignment pin is arranged near the cartridge detection sensor.

5. A disk apparatus according to claim 4, wherein said second alignment pin is shifted relative with the first alignment pin in a direction parallel to the insertion direction of the cartridge so as to prevent the second alignment pin from being engaged in the reference hole earlier than the first alignment pin.

6. A disk apparatus according to claim 1, wherein a top portion of the tip portion of the first alignment pin has a tapered surface so as to allow a slippage of the cartridge.

7. A disk drive apparatus having a mechanism for loading a cartridge, in which the cartridge, which is removable, is loaded, comprising:
   at least one sliding piece member which automatically opens a shutter when the cartridge is inserted into the disk drive apparatus and acts on a shutter opening and closing arm of the cartridge;
   an elevating plate on which a spindle motor for rotating a disk in the cartridge is mounted and on which first and second alignment pins inserted into two reference holes formed in the cartridge are mounted; and
   an elevator which moves the elevating plate to the cartridge side in accordance with the insertion of the cartridge into the disk drive apparatus, wherein the first and the second alignment pins provided on the elevating plate are positioned such that the first alignment pin is shifted relative to the second alignment pin in a direction parallel to the insertion direction of the cartridge.

8. A disk apparatus according to claim 7, further comprising:

a cartridge detection sensor provided on the elevating plate, wherein said first alignment pin is arranged on the opposite side of the cartridge detection sensor, and said second alignment pin is arranged near the cartridge detection sensor.

9. A disk apparatus according to claim 8, wherein said second alignment pin is shifted relative with the first alignment pin in a direction parallel to the insertion direction of the cartridge so as to prevent the second alignment pin from being engaged in the reference hole earlier than the first alignment pin.

10. A disk apparatus having a mechanism for loading a cartridge, in which the cartridge, which is removable, is loaded, comprising:

a cartridge holder supporting the cartridge inserted into the disk drive apparatus; and a plate arranged on the cartridge holder on which first and second alignment pins inserted into two reference holes formed in the cartridge are mounted; and wherein the first and the second alignment pins provided on the plate are positioned such that the first alignment pin is shifted relative to the second alignment pin in a direction parallel to the insertion direction of the cartridge.

11. A disk apparatus according to claim 10, further comprising:

a cartridge detection sensor provided on the plate, wherein said first alignment pin is arranged on the opposite side of the cartridge detection sensor, and said second alignment pin is arranged near the cartridge detection sensor.

12. A disk apparatus to claim 10, wherein said second alignment pin is shifted so a to prevent the second alignment pin from being engaged in the reference hole earlier than the first alignment pin.

* * * * *

UNITED STATES PATENT AND TRADEMARK OFFICE
CERTIFICATE OF CORRECTION

PATENT NO. : 6,388,975 B2
DATED : May 14, 2002
INVENTOR(S) : Shinoda et al.

It is certified that error appears in the above-identified patent and that said Letters Patent is hereby corrected as shown below:

<u>Title page,</u>
Item [57], ABSTRACT,
Line 19, please delete "on"

<u>Column 20,</u>
Line 18, please delete "a" and insert -- as --

Signed and Sealed this

Fourth Day of March, 2003

*Attest:*

*Attesting Officer*

JAMES E. ROGAN
*Director of the United States Patent and Trademark Office*